(12) United States Patent
Hiasa et al.

(10) Patent No.: US 11,005,126 B2
(45) Date of Patent: May 11, 2021

(54) ELECTROLYTIC SOLUTION FOR SECONDARY BATTERY, SECONDARY BATTERY, BATTERY PACK, ELECTRIC VEHICLE, ELECTRIC POWER STORAGE SYSTEM, ELECTRIC POWER TOOL, AND ELECTRONIC DEVICE

(71) Applicant: MURATA MANUFACTURING CO., LTD., Kyoto (JP)

(72) Inventors: Takumi Hiasa, Kyoto (JP); Toru Odani, Kyoto (JP); Kazumasa Takeshi, Kyoto (JP); Tadahiko Kubota, Kyoto (JP); Nadejda Krasteva, Surrey (GB); Silvia Rosselli, Surrey (GB); Gabriele Nelles, Surrey (GB); David Danner, Surrey (GB); Vitor Deichmann, Surrey (GB); Dennis Chercka, Surrey (GB); William Ford, Surrey (GB)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/293,207

(22) Filed: Mar. 5, 2019

(65) Prior Publication Data
US 2019/0207257 A1  Jul. 4, 2019

Related U.S. Application Data

(63) Continuation of application No. PCT/JP2017/027053, filed on Jul. 26, 2017.

(30) Foreign Application Priority Data

Sep. 6, 2016  (JP) .............................. JP2016-173851

(51) Int. Cl.
| | | |
|---|---|---|
| *H01M 10/0567* | (2010.01) | |
| *H01M 10/052* | (2010.01) | |
| *H01M 10/0569* | (2010.01) | |
| *H01M 10/42* | (2006.01) | |
| *H01M 10/0525* | (2010.01) | |

(52) U.S. Cl.
CPC ..... *H01M 10/0567* (2013.01); *H01M 10/052* (2013.01); *H01M 10/0525* (2013.01); *H01M 10/0569* (2013.01); *H01M 10/425* (2013.01); *H01M 2220/20* (2013.01); *H01M 2220/30* (2013.01); *H01M 2300/0025* (2013.01); *Y02E 60/10* (2013.01); *Y02T 10/70* (2013.01)

(58) Field of Classification Search
CPC .......... H01M 10/052; H01M 10/0525; H01M 10/0567; H01M 2220/20; H01M 2220/30; H01M 2300/0025; Y02E 60/122; Y02T 10/7011
See application file for complete search history.

(56) References Cited

U.S. PATENT DOCUMENTS

| | | | | |
|---|---|---|---|---|
| 6,218,810 B1* | 4/2001 | Matsumoto | ........... | H02J 7/0063 320/134 |
| 6,294,894 B1* | 9/2001 | Ochiai | ................. | G01R 31/396 320/132 |
| 8,579,043 B2* | 11/2013 | Hirayama | ................. | B25F 5/02 173/109 |
| 2004/0053138 A1* | 3/2004 | Otterstedt | ............. | H01M 4/505 429/307 |
| 2005/0100786 A1* | 5/2005 | Ryu | .................. | H01M 10/0525 429/199 |
| 2012/0025768 A1* | 2/2012 | Nakano | .................... | H02J 7/345 320/116 |
| 2012/0237836 A1* | 9/2012 | Kim | .................. | H01M 10/0525 429/336 |
| 2013/0060409 A1* | 3/2013 | Matsushita | ............ | B60K 6/442 701/22 |
| 2014/0220417 A1* | 8/2014 | Cheng | ............... | H01M 10/0525 429/156 |
| 2014/0342242 A1 | 11/2014 | Egorov et al. | | |
| 2015/0024267 A1* | 1/2015 | Jung | .................. | H01M 10/052 429/200 |
| 2017/0368958 A1* | 12/2017 | Eun | ........................... | B60L 7/10 |

FOREIGN PATENT DOCUMENTS

| | | | |
|---|---|---|---|
| JP | 2008-147014 | | 6/2008 |
| JP | 2008147014 A | | 6/2008 |
| KR | 10-2015-0075495 | * | 7/2015 |
| WO | 2011043403 | | 4/2011 |
| WO | WO 2016/117925 | * | 7/2016 |

OTHER PUBLICATIONS

Machine translation of KR 10-2015-0075495, published on Jul. 6, 2015 (Year: 2015).*
International Search Report for Application No. PCT/JP2017/027053, dated Sep. 12, 2017.
Japanese Office Action dated Sep. 1, 2000 in corresponding Japanese Application No. 2016-173851.

* cited by examiner

*Primary Examiner* — Anca Eoff
(74) *Attorney, Agent, or Firm* — K&L Gates LLP

(57) ABSTRACT

A secondary battery is provided. The secondary battery includes a positive electrode, a negative electrode, and an electrolytic solution. The electrolytic solution includes at least one of a first heterocyclic compound and a second heterocyclic compound.

14 Claims, 6 Drawing Sheets

ELECTROLYTIC SOLUTION FOR SECONDARY BATTERY, SECONDARY BATTERY, BATTERY PACK, ELECTRIC VEHICLE, ELECTRIC POWER STORAGE SYSTEM, ELECTRIC POWER TOOL, AND ELECTRONIC DEVICE

CROSS REFERENCE TO RELATED APPLICATIONS

The present application is a continuation of PCT patent application no. PCT/JP2017/027053, filed on Jul. 26, 2017, which claims priority to Japanese patent application no. JP2016-173851 filed on Sep. 6, 2016, the entire contents of which are being incorporated herein by reference.

BACKGROUND

The present technology generally relates to an electrolytic solution which can be used in a secondary battery; a secondary battery prepared using the electrolytic solution; and a battery pack, an electric vehicle, an electric power storage system, an electric power tool and an electronic device each provided with the secondary battery.

Various electronic devices such as a mobile phone and a personal digital assistant (PDA) have been widely spread, and it has been demanded to reduce the sizes of the electronic devices and to prolong the lives of the electronic devices. In response to this demand, the development of a battery, particularly a secondary battery that has a small size and a lightweight and can achieve a high energy density has been advanced as a power supply.

The application of a secondary battery to the above-mentioned electronic devices as well as other use applications has been studied. Examples of the other use applications include a battery pack which can be installed removably in an electronic device and the like, an electric vehicle such as an electric car, an electric power storage system such as an electric power server for home use, and an electric power tool such as an electric drill.

The secondary battery is provided with a positive electrode, a negative electrode and an electrolytic solution. The chemical composition of the electrolytic solution can largely affect the battery characteristics of the secondary battery. Therefore, the chemical composition of the electrolytic solution has been studied extensively.

More specifically, a thiophene derivative or the like is added to the electrolytic solution for the purpose of improving the battery characteristics including charge-discharge cycle characteristics.

SUMMARY

Electronic devices and the like have been increasingly advanced in terms of the performance and functions thereof. As a result, the use frequencies of the electronic devices and the like have been increasing and the use environment of the electronic devices and the like has been expanded. Therefore, there is still room for the improvement in the battery characteristics of a secondary battery.

In these situations, it is desirable to provide an electrolytic solution for a secondary battery which enables the achievement of excellent battery characteristics, a secondary battery, a battery pack, an electric vehicle, an electric power storage system, an electric power tool and an electronic device.

According to an embodiment of the present disclosure, an electrolytic solution for a secondary battery is provided. The electrolytic solution includes at least one of a first heterocyclic compound represented by formula (1) and a second heterocyclic compound represented by formula (2) shown below:

[formula (1)]

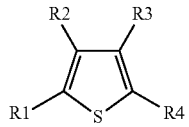

(1)

(wherein R1 to R4 independently represent any one group selected from the group consisting of a hydrogen group (—H), a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, and combinations thereof, wherein each of at least two of R1 to R4 represents a monovalent halogenated hydrocarbon group or at least one of R1 to R4 represents a nitrogen-containing group); and

[formula (2)]

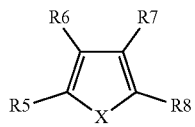

(2)

(wherein X is selected from the group consisting of a (nitrogen atom)-(hydrogen atom) (NH), an oxygen atom (O) and a (phosphorus atom)-(hydrogen atom) (PH); and R5 to R8 independently represent any one group selected from the group consisting of a hydrogen group, a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, and combinations thereof, wherein at least one of R5 to R8 represents any one group selected from a halogen group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, and combinations thereof).

According to an embodiment of the present disclosure, a secondary battery is provided. The secondary battery includes a positive electrode, a negative electrode and an electrolytic solution, wherein the electrolytic solution has the same composition as that of the above-mentioned electrolytic solution for a secondary battery according to one embodiment of the present technology.

Each of a battery pack, an electric vehicle, an electric power storage system, an electric power tool and an electronic device according to one embodiment of the present technology is provided with a secondary battery, wherein the secondary battery has the same configuration as that of the above-mentioned secondary battery according to one embodiment of the present technology.

The term "monovalent hydrocarbon group" as used herein is a general term for monovalent groups each composed of carbon (C) and hydrogen (H). The term "monovalent halogenated hydrocarbon group" as used herein is a general term for groups each formed by substituting at least one hydrogen group in each of the above-mentioned monovalent hydrocarbon groups by a halogen group. The term "monovalent oxygen-containing group" as used herein is a general term for monovalent groups each containing oxygen (O) as a constituent element. The term "monovalent nitrogen-containing group" as used herein is a general term for monovalent groups each containing nitrogen (N) as a constituent element. The term "monovalent sulfur-containing group" as used herein is a general term for monovalent groups each containing sulfur (S) as a constituent element.

According to an embodiment of the present technology, the electrolytic solution includes at least one of the first heterocyclic compound and the second heterocyclic compound as described herein. Accordingly, excellent battery characteristics can be achieved. In a battery pack, an electric vehicle, an electric power storage system, an electric power tool or an electronic device according to one embodiment of the present technique, the same effect can also be achieved.

The effect described herein is not necessarily limited, and may be any one of the effects described in the present technology.

The present technology should not be interpreted as being limited by the exemplified effects and other suitable properties relating to the present technology may be realized and as further described.

DETAILED DESCRIPTION

Figure 1:
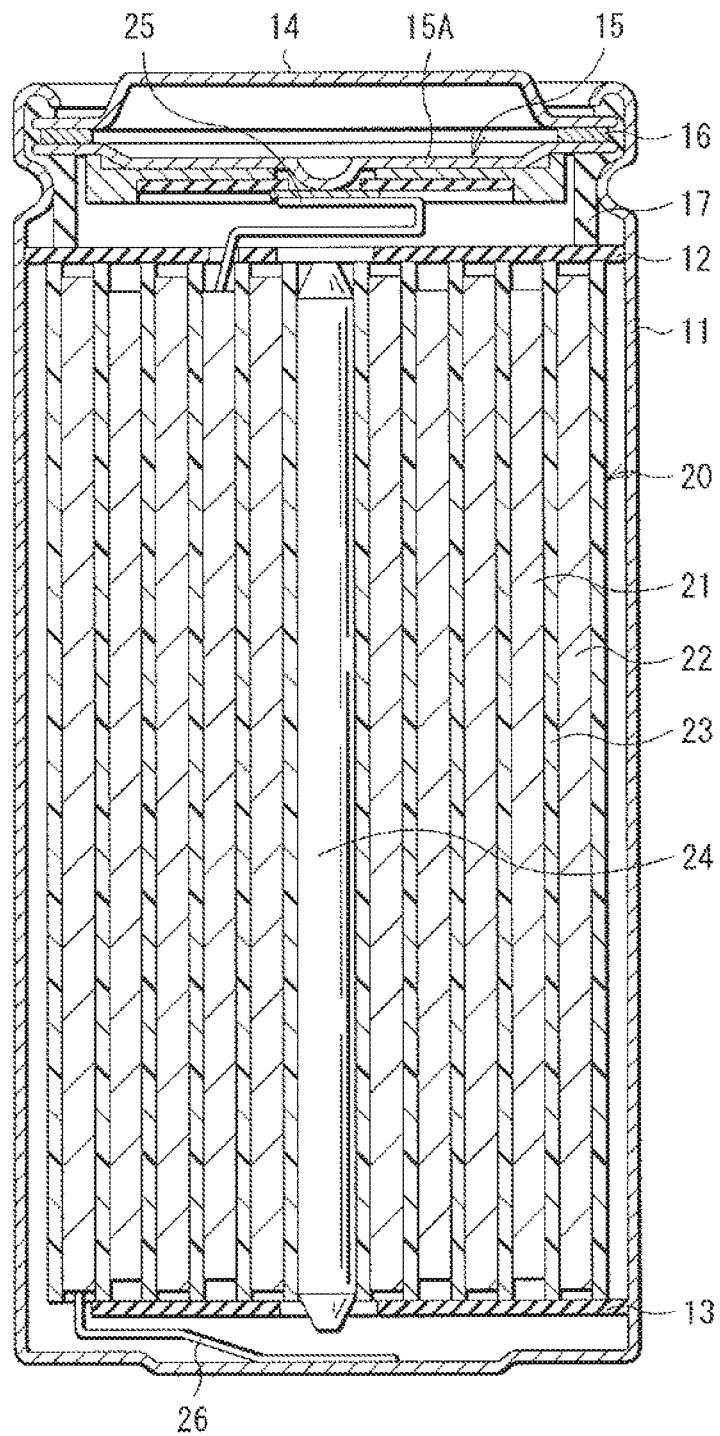
FIG. 1 is a cross-sectional view illustrating a configuration of a (cylinder-type) secondary battery according to an embodiment of the present technology.

As described herein, the present disclosure will be described based on examples with reference to the drawings, but the present disclosure is not to be considered limited to the examples, and various numerical values and materials in the examples are considered by way of example.

Firstly, an electrolytic solution for a secondary battery according to one embodiment of the present technology will be described.

The electrolytic solution for a secondary battery (also simply referred to as an "electrolytic solution", hereinafter) described in this section can be used in, for example, a secondary battery such as a lithium ion secondary battery. The type of the secondary battery in which the electrolytic solution can be used is not limited to a lithium ion secondary battery.

The electrolytic solution contains a heterocyclic compound. More specifically, the heterocyclic compound includes one or both of a first heterocyclic compound represented by formula (1) and a second heterocyclic compound represented by formula (2) shown below:

[formula (1)]

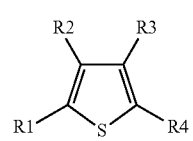

(1)

(wherein R1 to R4 independently represent any one group selected from a hydrogen group, a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, wherein each of at least two of R1 to R4 represents a monovalent halogenated hydrocarbon group or at least one of R1 to R4 represents a nitrogen-containing group); and

[formula (2)]

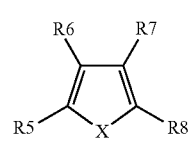

(2)

(wherein X represents any one group selected from a (nitrogen atom)-(hydrogen atom), an oxygen atom and a (phosphorus atom)-(hydrogen atom); and R5 to R8 independently represent any one group selected from a hydrogen group, a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, wherein at least one of R5 to R8 represents any one group selected from a halogen group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other)

The reason why the electrolytic solution contains the heterocyclic compound is because the chemical stability of the electrolytic solution can be improved and therefore the occurrence of a decomposition reaction of the electrolytic solution can be prevented during charge-discharge procedures. In this case, the occurrence of a decomposition reaction of the electrolytic solution can be prevented particularly even in severe environments such as a high-temperature environment and a low-temperature environment.

The content of the heterocyclic compound in the electrolytic solution is not particularly limited, and is, for example, 0.01 to 3% by weight, preferably 0.1 to 3% by weight. This is because the occurrence of a decomposition reaction of the electrolytic solution can be prevented satisfactorily while retaining a battery capacity.

The details about the above-mentioned "content" are as follows. In the case where the electrolytic solution contains only the first heterocyclic compound, the "content" is the content of the first heterocyclic compound. In the case where the electrolytic solution contains only the second heterocyclic compound, the "content" is the content of the second heterocyclic compound. In the case where the electrolytic solution contains both of the first heterocyclic compound and the second heterocyclic compound, the "content" is the sum total of the content of the first heterocyclic compound and the content of the second heterocyclic compound.

The first heterocyclic compound is a compound in which substituents (R1 to R4) are introduced into a thiophene backbone, and is a so-called thiophene derivative. A single type of the first heterocyclic compound may be used, or two or more types of the first heterocyclic compounds may be used.

The type of the halogen group is not particularly limited, and includes, for example, a fluorine group (—F), a chlorine group (—Cl), a bromine group (—Br) and an iodine group (—I).

The monovalent hydrocarbon group is a general term for monovalent groups each composed of carbon and hydrogen, as mentioned above. The monovalent hydrocarbon group may have a linear form or a branched form having one or more side chains. The monovalent hydrocarbon group may be an unsaturated hydrocarbon group that contains one or more carbon-carbon multiple bonds or a saturated hydrocarbon group that contains no carbon-carbon multiple bond. The carbon-carbon multiple bond may be, for example, a carbon-carbon double bond (>C=C<), a carbon-carbon triple bond (—C≡C—) or the like.

The type of the monovalent hydrocarbon group is not particularly limited, and includes, for example, an alkyl group, an alkenyl group, an alkynyl group, a cycloalkyl group, an aryl group, and a monovalent group formed by bonding two or more of the aforementioned groups to each other (which is also referred to as a "monovalent bonded group", hereinafter).

The type of the monovalent bonded group is not particularly limited, and includes, for example, a monovalent group formed by bonding an alkyl group to an alkenyl group, a monovalent group formed by bonding an alkyl group to an alkynyl group, a monovalent group formed by bonding an alkenyl group to an alkynyl group, a monovalent group formed by bonding any one of an alkyl group, an alkenyl group and an alkynyl group to a cycloalkyl group, and a monovalent group formed by bonding any one of an alkyl group, an alkenyl group and an alkynyl group to an aryl group.

The number of carbon atoms in the monovalent hydrocarbon group is not particularly limited. More specifically, the number of carbon atoms in the alkyl group is, for example, 1 to 10. The number of carbon atoms in each of the alkenyl group and the alkynyl group is, for example, 2 to 10. The number of carbon atoms in each of the cycloalkyl group and the aryl group is, for example, 6 to 18. This is because that the chemical stability of the electrolytic solution can be improved satisfactorily while securing the solubility and compatibility of the first heterocyclic compound. Particularly, it is preferred that the number of carbon atoms in the alkyl group be 1 to 5, more preferably 1 to 3. This is because the solubility, compatibility and the like of the first heterocyclic compound can be further improved.

Specific examples of the alkyl group include a methyl group (—$CH_3$), an ethyl group (—$C_2H_5$), a propyl group (—$C_3H_7$), a t-butyl group (—$C(-CH_3)_2$—$CH_3$), a nonyl group (—$C_9H_{19}$) and a decyl group (—$C_{10}H_{21}$). Specific examples of the alkenyl group include a vinyl group (—CH=$CH_2$) and an allyl group (—$CH_2$—CH=$CH_2$). A specific example of the alkynyl group is an ethynyl group (—C≡CH). Specific examples of the cycloalkyl group include a cyclopropyl group, a cyclobutyl group, a cyclopentyl group, a cyclohexyl group, a cycloheptyl group and a cyclooctyl group. Specific examples of the aryl group include a phenyl group and a naphthyl group. A specific example of the monovalent bonded group is a benzyl group.

As mentioned above, the monovalent halogenated hydrocarbon group is a group formed by substituting at least one hydrogen group in a monovalent hydrocarbon group by a halogen group. The details about the halogen group are as mentioned above. A single type of the halogen group may be used, or two or more of the halogen groups may be used.

The type of the halogen group having a hydrogen group is not particularly limited, and is preferably a fluorine group. This is because the chemical stability of the electrolytic solution can be further improved while securing the solubility, compatibility and the like of the first heterocyclic compound.

A group in which at least one hydrogen group in a monovalent hydrocarbon group is substituted by a fluorine group is a monovalent fluorinated hydrocarbon group. The type of the monovalent fluorinated hydrocarbon group is not particularly limited. An example of the group is a group in which at least one hydrogen group in any one group selected from the specific examples of the alkyl group, the specific examples of the alkenyl group, the specific examples of the cycloalkyl group, the specific examples of the aryl group and the specific examples of the monovalent bonded group is substituted by a fluorine group. Namely, the group is a fluorinated alkyl group, a fluorinated alkenyl group, a fluorinated alkynyl group, a fluorinated cycloalkyl group, a fluorinated aryl group or the like.

Specific examples of the fluorinated alkyl group include a fluoromethyl group (—$CH_2F$), a difluoromethyl group (—$CHF_2$), a perfluoromethyl group (—$CF_3$), a perfluoroethyl group (—$C_2F_5$), a perfluoropropyl group (—$C_3F_7$) and a perfluoro-t-butyl group (—$C(-CF_3)_2$—$CF_3$). A specific example of the fluorinated alkenyl group is a perfluorovinyl group (—CF=$CF_2$). A specific example of the fluorinated cycloalkyl group is a perfluorocyclohexyl group. A specific example of the fluorinated aryl group is a perfluoroaryl group. A specific example of the fluorinated monovalent bonded group is a perfluorobenzyl group.

The number of fluorine groups in the monovalent fluorinated hydrocarbon group is not particularly limited. Particularly, the number of fluorine groups in a monovalent fluorinated hydrocarbon group is preferably as large as possible. Namely, the monovalent fluorinated hydrocarbon group is preferably a perfluoroalkyl group. This is because the compatibility, solubility and the like of the first heterocyclic compound can be further improved.

For the above-mentioned reasons, the monovalent fluorinated hydrocarbon group is preferably a perfluoromethyl group ($—CF_3$), a perfluoroethyl group ($—C_2F_5$), a perfluoropropyl group ($—C_3F_7$) or the like which are the above-mentioned perfluoroalkyl groups. The number of carbon atoms in the perfluoroalkyl group is preferably 1 to 10, more preferably 1 to 5, still more preferably 1 to 3, as mentioned above.

As mentioned above, the term "monovalent oxygen-containing group" is a general term for monovalent groups each containing oxygen as a constituent element. The type of the monovalent oxygen-containing group is not particularly limited, and includes, for example, a hydroxyl group (—OH), an alkoxy group (—OR101: wherein R101 represents any one group selected from an alkyl group and an aryl group), a carboxyl group (—COOH), a carboxylic acid ester group (—COOR102: wherein R102 represents any one group selected from an alkyl group and an aryl group), an aldehyde group (—CHO), and an acyl group (—COR103: wherein R103 represents any one group selected from an alkyl group and an aryl group). The details about the alkyl group and the aryl group are as mentioned above.

As mentioned above, the term "monovalent nitrogen-containing group" is a general term for monovalent groups each containing nitrogen as a constituent element. The type of the monovalent nitrogen-containing group is not particularly limited, and includes, for example, a cyano group (—CN), an amino group (—NR104R105: wherein R104 and R105 independently represent any one group selected from a hydrogen group, an alkyl group and an aryl group), a nitro group ($—NO_2$), a nitroso group (—NO), an isocyanate group (—NCO), an azide group ($—N_3$) and a diazonium group ($—N_2^+$). The details about the alkyl group and the aryl group are as mentioned above, for example. The group containing both of oxygen and nitrogen as constituent elements is not referred to as a monovalent oxygen-containing group, and is referred to as a monovalent nitrogen-containing group.

As mentioned above, the term "monovalent sulfur-containing group" is a general term for monovalent groups each containing sulfur as a constituent element. The type of the monovalent sulfur-containing group is not particularly limited, and includes, for example, a sulfo group ($—SO_3H$), a thiol group (—SH), a thioether group (—SR106: wherein R106 represents any one group selected from an alkyl group and an aryl group) and a thioketone group (—CS—R107: wherein R107 represents any one group selected from an alkyl group and an aryl group). The group containing both of oxygen and sulfur as constituent elements, the group containing both of nitrogen and sulfur as constituent elements, and the group containing all of oxygen, nitrogen and sulfur as constituent elements are not referred to as monovalent oxygen-containing groups, and are referred to as monovalent sulfur-containing groups.

(Case where at Least Two of R1 to R4 are Monovalent Halogenated Hydrocarbon Groups)

As mentioned above, at least two of R1 to R4 are monovalent halogenated hydrocarbon groups.

The following compounds do not correspond to the first heterocyclic compound described in this section: firstly, a compound in which no substituent is introduced into a thiophene backbone (thiophene); secondly, a compound in which a substituent is introduced into a thiophene backbone but the substituent does not contain a monovalent halogenated hydrocarbon group (a thiophene derivative); and thirdly, a compound in which a monovalent hydrogenated hydrocarbon group is introduced as a substituent into a thiophene backbone but the number of the monovalent halogenated hydrocarbon group is just one (a thiophene derivative).

The reason why each of at least two of R1 to R4 is a monovalent halogenated hydrocarbon group is because the chemical stability of the electrolytic solution can be further improved and therefore the occurrence of a decomposition reaction of the electrolytic solution can be prevented more effectively compared with the case where each of at least two of R1 to R4 is not a monovalent halogenated hydrocarbon group.

In the case where each of at least two of R1 to R4 is a monovalent halogenated hydrocarbon group, the number of monovalent halogenated hydrocarbon groups is not particularly limited, and may be 2, 3 or 4.

Particularly, the number of the monovalent halogenated hydrocarbon groups is preferably 2. This is because the occurrence of a decomposition reaction of the electrolytic solution can be prevented satisfactorily while securing battery capacity.

The position at which a monovalent halogenated hydrocarbon group is to be introduced into the thiophene backbone is not particularly limited. As apparent from formula (1), the "position" is position-2 which corresponds to R1, position-3 which corresponds to R2, position-4 which corresponds to R3, or position-5 which corresponds to R4.

Among these positions, the position at which the monovalent halogenated hydrocarbon group is to be introduced into the thiophene backbone is preferably a position adjacent to a hetero atom (sulfur atom), specifically preferably position-2 or position-5. This is because the first heterocyclic compound is activated so that the first heterocyclic compound can become more reactive. As a result, the chemical stability of the electrolytic solution containing the first heterocyclic compound can be further improved, and the occurrence of a decomposition reaction of the electrolytic solution can be prevented more effectively.

For these reasons, in the case where the number of the monovalent halogenated hydrocarbon groups is 2, the positions at which the monovalent halogenated hydrocarbon groups are introduced into the thiophene backbone are preferably position-2 and position-5. Namely, in the case where each of two of R1 to R4 represents a monovalent halogenated hydrocarbon group, it is preferred that each of R1 and R4 represent a monovalent halogenated hydrocarbon group. This is because the first heterocyclic compound is further activated so that the first heterocyclic compound can become more reactive. As a result, the chemical stability of the electrolytic solution containing the first heterocyclic compound can be further improved and the occurrence of a decomposition reaction of the electrolytic solution can be prevented significantly.

In the case where the number of the monovalent halogenated hydrocarbon groups is 3, the positions at which the monovalent halogenated hydrocarbon groups are introduced to the thiophene backbone are preferably position-2, position-5 and either one of position-3 and position-4. As a matter of course, in the case where the number of the monovalent halogenated hydrocarbon groups is 4, the positions at which the monovalent halogenated hydrocarbon groups are introduced into the thiophene backbone are position-2 to position-5.

The type of the monovalent halogenated hydrocarbon group to be introduced into the thiophene backbone is preferably a perfluoroalkyl group. The number of carbon atoms in the perfluoroalkyl group is preferably 1 to 10, more preferably 1 to 5, still more preferably 1 to 3.

In the case where the number of the monovalent halogenated hydrocarbon groups to be introduced into the thiophene backbone is 2 or 3, the type of other group that is not a monovalent halogenated hydrocarbon group is not particularly limited as long as being any one group selected from a hydrogen group, a halogen group, a monovalent hydrocarbon group, a monovalent oxygen-containing group, a monovalent nitrogen-containing group, a monovalent sulfur-containing group and a monovalent bonded group as mentioned above.

(Case where at Least One of R1 to R4 Represents Cyano Group)

As mentioned above, at least one of R1 to R4 is a nitrogen-containing group. A specific example of the nitrogen-containing group is a cyano group.

Therefore, the following compounds do not correspond to the first heterocyclic compound mentioned herein: firstly, a compound in which no substituent is introduced into a thiophene backbone (thiophene); and secondly, a compound in which a substituent is introduced into a thiophene backbone but the substituent does not contain a cyano group (a thiophene derivative).

The reason why at least one of R1 to R4 is a cyano group is because the chemical stability of the electrolytic solution can be further improved and therefore the occurrence of a decomposition reaction of the electrolytic solution can be prevented more effectively compared with the case where at least one of R1 to R4 is not a cyano group.

In the case where at least one of R1 to R4 is a cyano group, the number of cyano groups is not particularly limited and may be 1, 2, 3 or 4.

Particularly, the number of cyano groups is preferably 2. This is because that the occurrence of a decomposition reaction of the electrolytic solution can be prevented satisfactorily while securing battery capacity.

The position at which a cyano group is introduced into the thiophene backbone is not particularly limited. Particularly, the position at which a cyano group is introduced into the thiophene backbone is preferably adjacent to a sulfur atom, more specifically position-2 or position-5. This is because that the first heterocyclic compound is activated so that the first heterocyclic compound can become more reactive. As a result, the chemical stability of the electrolytic solution containing the first heterocyclic compound can be further improved and the occurrence of a decomposition reaction of the electrolytic solution can be prevented more effectively.

For this reason, in the case where the number of a cyano group is 1, the position at which the cyano group is introduced into the thiophene backbone is preferably position-2 or position-5. Namely, in the case where one of R1 to R4 is a cyano group, it is preferred that any one of R1 and R4 be a cyano group. This is because that the first heterocyclic compound is further activated so that the first heterocyclic compound can become more reactive. As a result, the chemical stability of the electrolytic solution containing the first heterocyclic compound can be further improved, and therefore the occurrence of a decomposition reaction of the electrolytic solution can be prevented significantly.

In the case where the number of cyano groups is 2, the positions at which the cyano groups are introduced into the thiophene backbone are preferably position-2 and position-5. This is because that the first heterocyclic compound is significantly activated so that the first heterocyclic compound can become more reactive. In the case where the number of cyano groups is 3, the position at which the cyano groups are introduced into the thiophene backbone are preferably position-2, position-5 and either one of position-3 and position-4. As a matter of course, in the case where the number of cyano groups is 4, the positions at which the cyano groups are introduced into the thiophene backbone are position-2 to position-5.

In the case where the number of a cyano group or cyano groups to be introduced into the thiophene backbone is 1, 2 or 3, the type of other group or groups which is or are different from a cyano group or cyano groups, is not particularly limited, as long as being any one of a hydrogen group, a halogen group, a monovalent hydrocarbon group, a monovalent halogenated hydrocarbon group, a monovalent oxygen-containing group, a monovalent nitrogen-containing group (excluding a cyano group), a monovalent sulfur-containing group and a monovalent bonded group as mentioned above.

Specific examples of the first heterocyclic compound include compounds respectively represented by formula (1-1) to formula (1-27).

[formula (1-1) to (1-27)]

(1-1)

(1-2)

(1-3)

(1-4)

(1-5)

(1-6)

(1-7)

-continued

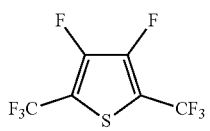 (1-8)

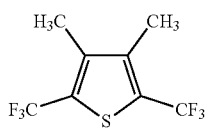 (1-9)

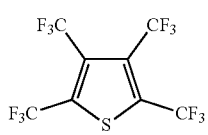 (1-10)

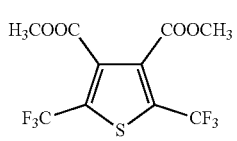 (1-11)

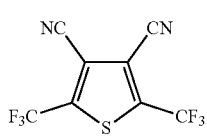 (1-12)

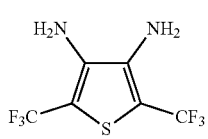 (1-13)

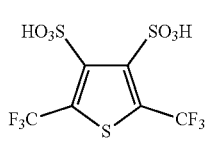 (1-14)

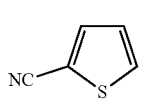 (1-15)

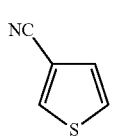 (1-16)

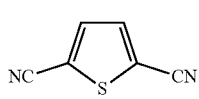 (1-17)

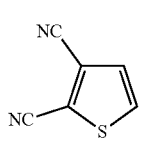 (1-18)

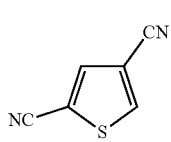 (1-19)

-continued

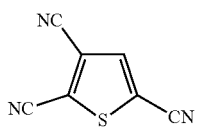 (1-20)

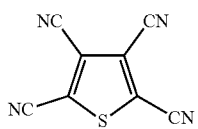 (1-21)

 (1-22)

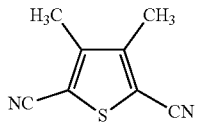 (1-23)

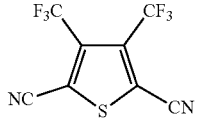 (1-24)

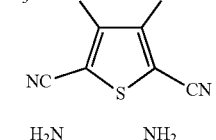 (1-25)

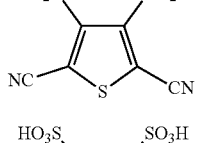 (1-26)

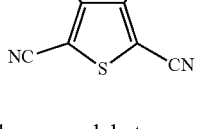 (1-27)

The second heterocyclic compound is a compound in which a substituent (R5 to R8) is introduced into each of a pyrrole backbone (X=NH), a furan backbone (X=O) and a phosphole backbone (X=PH), and is a so-called pyrrole derivative, furan derivative or phosphole derivative. A single type of the second heterocyclic compound may be used, or two or more types of the second heterocyclic compounds may be used.

As mentioned above, at least one of R5 to R8 is a halogen group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other.

For this reason, the following compounds do not correspond to the second heterocyclic compound mentioned in this section: firstly, a compound in which no substituent is introduced into each of a pyrrole backbone, a furan backbone and a phosphole (pyrrole, furan and phosphole); and secondly, a compound in which a substituent is introduced into each of a pyrrole backbone, a furan backbone and a phosphole backbone but the substituent does not contain the halogen group or the like as mentioned above (a pyrrole derivative, a furan derivative and a phosphole derivative).

The details about the halogen group, the monovalent hydrocarbon group, the monovalent halogenated hydrocarbon group, the monovalent oxygen-containing group, the monovalent nitrogen-containing group, the monovalent sulfur-containing group and the group formed by bonding two or more of them to each other are as mentioned above.

The reason whey at least one of R5 to R8 is a halogen group or the like is because the chemical stability of the electrolytic solution can be further improved and therefore the occurrence of a decomposition reaction of the electrolytic solution can be prevented more effectively compared with the case where at least one of R5 to R8 is not a halogen group or the like.

In the case where at least one of R5 to R8 is a halogen group or the like, the number of the halogen group or the like is not particularly limited, and may be 1, 2, 3 or 4.

Particularly, the number of the halogen group or the like is preferably 2 or more. This is because that the occurrence of a decomposition reaction of the electrolytic solution can be prevented more effectively while securing battery capacity.

The position at which a halogen group or the like is to be introduced into each of a pyrrole backbone, a furan backbone and a phosphole backbone is not particularly limited. Particularly, the position at which a halogen group or the like is to be introduced into each of a pyrrole backbone, a furan backbone and a phosphole backbone is preferably a position adjacent to a hetero atom (a nitrogen atom, an oxygen atom and a sulfur atom), and is more specifically preferably position-2 or position-5. This is because the second heterocyclic compound is activated so that the second heterocyclic compound can become more reactive. As a result, the chemical stability of the electrolytic solution containing the second heterocyclic compound can be further improved and therefore the occurrence of a decomposition reaction of the electrolytic solution can be prevented more effectively.

As a result, in the case where the number of a halogen group and the like is 2, the positions at which the halogen group and the like are to be introduced into each of a pyrrole backbone, a furan backbone and a phosphole backbone is preferably position-2 and position-5. Namely, in the case where two of R1 to R4 are a halogen group and the like, each of R1 and R4 is preferably a halogen group or the like. This is because the second heterocyclic compound is further activated so that the second heterocyclic compound can become more reactive. As a result, the chemical stability of the electrolytic solution containing the second heterocyclic compound can be further improved, and therefore the occurrence of a decomposition reaction of the electrolytic solution can be significantly prevented.

In the case where the number of a halogen group and the like is 3, the positions at which the halogen group and the like are to be introduced into each of a pyrrole backbone, a furan backbone and a phosphole backbone is preferably position-2, position-5 and either one of position-3 and position-4. As a matter of course, in the case where the number of a halogen group and the like is 4, the positions at which the halogen group and the like are to be introduced into each of a pyrrole backbone, a furan backbone and a phosphole backbone are preferably position-2 to position-5.

The type of the halogen group or the like to be introduced into each of a pyrrole backbone, a furan backbone and a phosphole backbone is not particularly limited, and is particularly preferably a monovalent halogenated hydrocarbon group, more preferably a perfluoroalkyl group. The number of carbon atoms in the perfluoroalkyl group is preferably 1 to 10, more preferably 1 to 5, still more preferably 1 to 3.

In the case where the number of the halogen group and the like to be introduced into each of a pyrrole backbone, a furan backbone and a phosphole backbone is 2 or 3, the type of other group that is different from a halogen group or the like is not particularly limited, as long as being any one group selected from a hydrogen group, a halogen group, a monovalent hydrocarbon group, a monovalent halogenated hydrocarbon group, a monovalent oxygen-containing group, a monovalent nitrogen-containing group, a monovalent sulfur-containing group and a monovalent bonded group as mentioned above.

Specific examples of the second heterocyclic compound include compounds represented by formulae (2-1) to (2-22), formulae (2-31) to (2-52) and formulae (2-61) to (2-82).

[formula (2-1) to (2-22)]

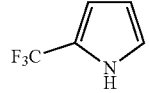

(2-1)

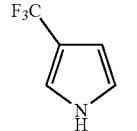

(2-2)

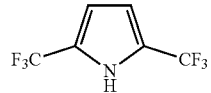

(2-3)

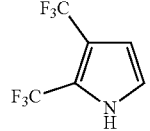

(2-4)

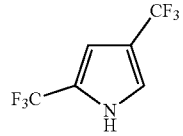

(2-5)

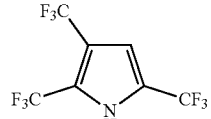

(2-6)

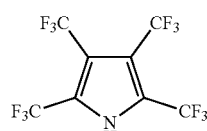

(2-7)

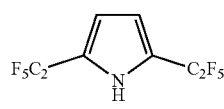

(2-8)

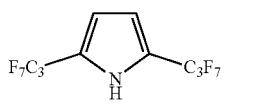
(2-9)
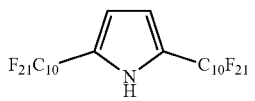
(2-10)
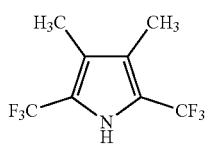
(2-11)
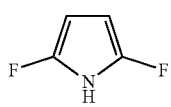
(2-12)
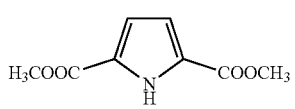
(2-13)
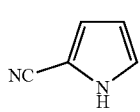
(2-14)
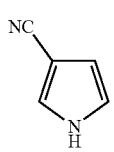
(2-15)
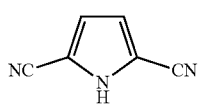
(2-16)
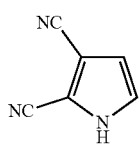
(2-17)
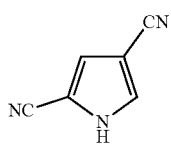
(2-18)
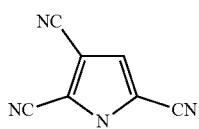
(2-19)
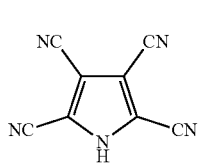
(2-20)
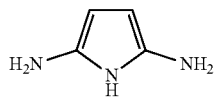
(2-21)
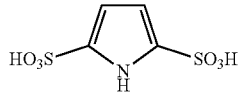
(2-22)
[formula (2-31) to (2-52)]
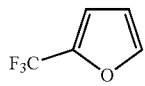
(2-31)
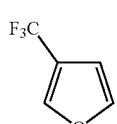
(2-32)
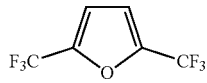
(2-33)
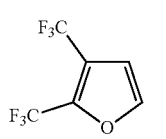
(2-34)
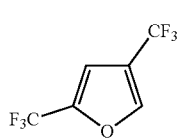
(2-35)
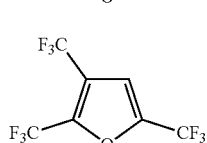
(2-36)
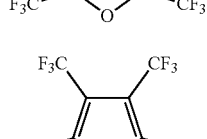
(2-37)
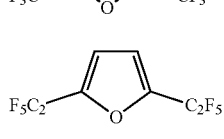
(2-38)
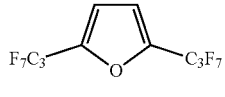
(2-39)
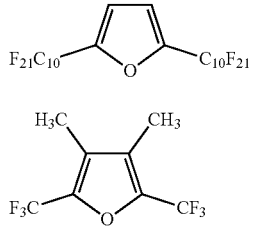
(2-40)
(2-41)

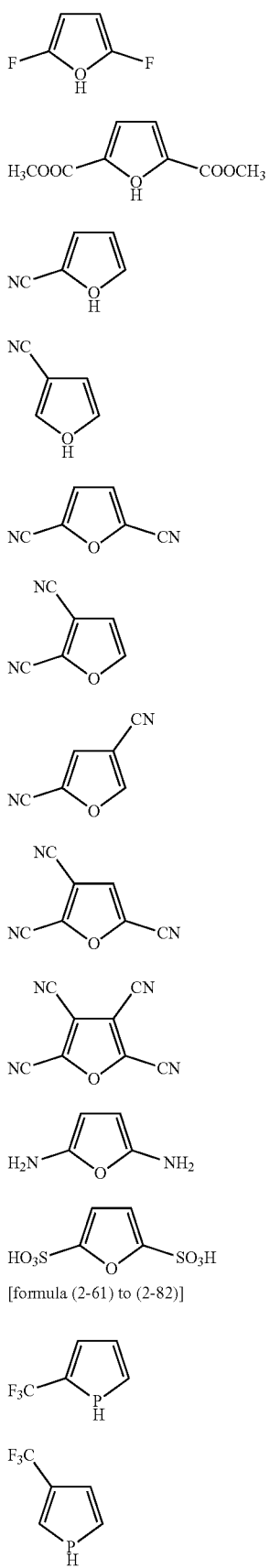
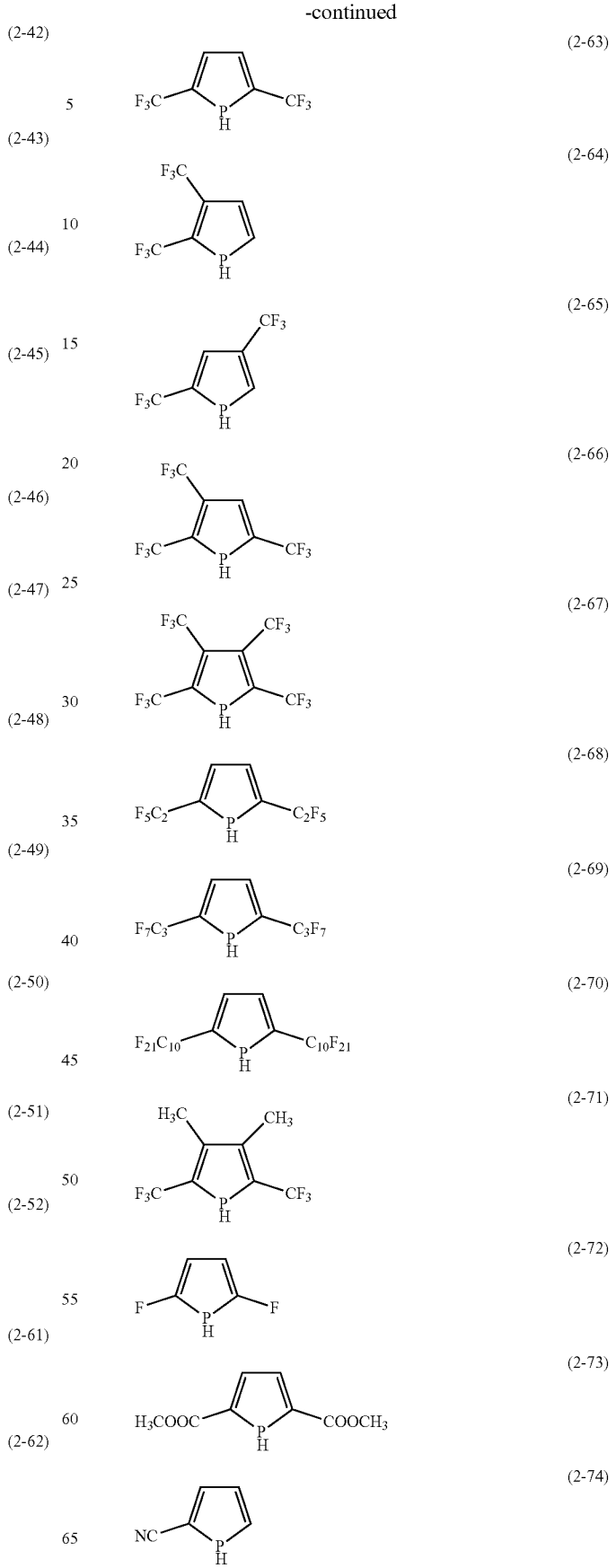

-continued

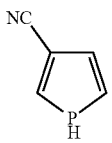
(2-75)

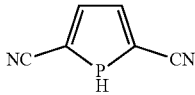
(2-76)

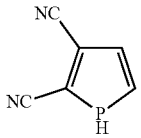
(2-77)

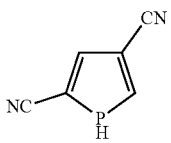
(2-78)

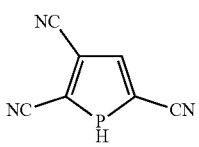
(2-79)

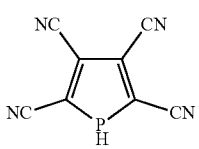
(2-80)

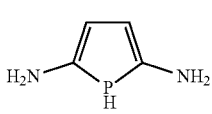
(2-81)

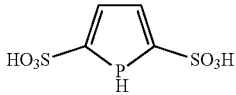
(2-82)

The compounds represented by formulae (2-1) to (2-22) are compounds each containing a pyrrole backbone. The compounds represented by formulae (2-31) to (2-52) are compounds each containing a furan backbone. The compounds represented by formula (2-61) to formula (2-82) are compounds each containing a phosphole backbone.

The electrolytic solution may also contain at least one component selected from other materials, in addition to the above-mentioned heterocyclic compounds.

The "other material" includes at least any one solvent selected from solvents such as a non-aqueous solvent (organic solvent). The electrolytic solution containing a non-aqueous solvent is a so-called non-aqueous electrolytic solution.

The solvent may be, for example, a cyclic carbonic acid ester, a linear carbonic acid ester, a lactone, a linear carboxylic acid ester and a nitrile (mononitrile). This is because excellent battery capacity, excellent cycle characteristics, excellent storage properties and the like can be achieved.

Specific examples of the cyclic carbonic acid ester include ethylene carbonate, propylene carbonate and butylene carbonate. Specific examples of the linear carbonic acid ester include dimethyl carbonate, diethyl carbonate, ethyl methyl carbonate and methyl propyl carbonate. Specific examples of the lactone include γ-butyrolactone and γ-valerolactone. Specific examples of the linear carboxylic acid ester include methyl acetate, ethyl acetate, methyl propionate, ethyl propionate, propyl propionate, methyl butyrate, methyl isobutyrate, methyl trimethylacetate and ethyl trimethylacetate. Specific examples of the nitrile include acetonitrile, methoxyacetonitrile and 3-methoxypropionitrile.

In addition, the solvent may also be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate or dimethylsulfoxide. This is because the same advantages can be achieved.

Particularly, the solvent preferably includes at least one compound selected from ethylene carbonate, propylene carbonate, dimethyl carbonate, diethyl carbonate, ethyl methyl carbonate and the like. This is because a high battery capacity, excellent cycle characteristics, excellent storage properties and the like can be achieved. In this case, a combination of a high-viscosity (high dielectric constant) solvent (e.g., relative permittivity ε≥30) (e.g., ethylene carbonate and propylene carbonate) and a low-viscosity solvent (e.g., viscosity≤1 mPa·s) (e.g., dimethyl carbonate, ethyl methyl carbonate and diethyl carbonate) is more preferred. This is because the dissociability of an electrolyte salt and the mobility of ions can be improved.

The solvent preferably includes propylene carbonate. This is because the secondary battery becomes less likely to be swollen even when charging and discharging are repeated at a voltage as high as 4.4 V or more. Particularly in a laminate film-type secondary battery provided with a film-like external packaging member as mentioned below, the secondary battery inherently tends to be swollen. However, when the solvent contains propylene carbonate, a synergistic effect between the propylene carbonate and the heterocyclic compound can be produced and therefore the swelling of the secondary battery can be prevented effectively. The content of propylene carbonate in the solvent is not particularly limited, and is, for example, 5 to 80% by weight.

The solvent may include at least one selected from an unsaturated cyclic carbonic acid ester, a halogenated carbonic acid ester, a sulfonic acid ester, an acid anhydride, a dinitrile compound and a diisocyanate compound. This is because the chemical stability of the electrolytic solution can be further improved. Particularly in the above-mentioned laminate film-type secondary battery, when the solvent includes at least one selected from an unsaturated cyclic carbonic acid ester, a halogenated carbonic acid ester and a dinitrile compound, a synergistic effect between the unsaturated cyclic carbonic acid ester or the like and the heterocyclic compound can be produced, and the swelling of the secondary battery can be prevented effectively.

The unsaturated cyclic carbonic acid ester is a cyclic carbonic acid ester containing at least one unsaturated bond (a carbon-carbon double bond), such as compounds respectively represented by formulae (3) to (5) shown below. The content of the unsaturated cyclic carbonic acid ester in the solvent is not particularly limited, and is, for example, 0.01 to 10% by weight.

[formula (3) to (5)]

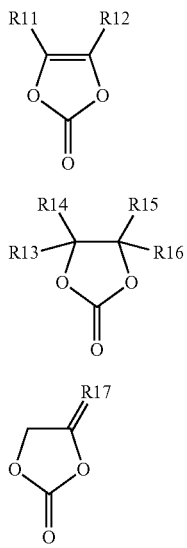

[formula (6) to (7)]

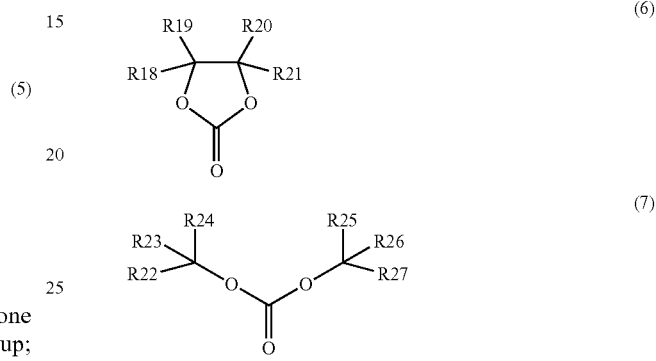

(wherein R11 and R12 independently represent any one group selected from a hydrogen group and an alkyl group; R13 to R16 independently represent any one group selected from a hydrogen group, an alkyl group, a vinyl group and an allyl group, wherein at least one of R13 to R16 represents any one group selected from a vinyl group and an allyl group; R17 represents a group represented by formula>CR171R172; R171 and R172 independently represent any one group selected from a hydrogen group and an alkyl group).

The compound represented by formula (3) is a vinylene carbonate-type compound. R11 and R12 may be the same as each other, or may be different groups from each other. The details about the alkyl group are as mentioned above. Specific examples of the vinylene carbonate-type compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one and 4-trifluoromethyl-1,3-dioxol-2-one.

The compound represented by formula (4) is a vinyl ethylene carbonate-type compound. R13 to R16 may be the same group as one another or may be different groups from one another. As a matter of course, some of R13 to R16 may be the same group as one another. Specific examples of the vinyl ethylene carbonate-type compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one and 4,5-divinyl-1,3-dioxolan-2-one.

The compound represented by formula (5) is a methylene ethylene carbonate-type compound. R171 and R172 may be the same group as each other, or may be different groups from each other. Specific examples of the methylene ethylene carbonate-type compound include methylene ethylene carbonate (4-methylene-1,3-dioxolan-2-one), 4,4-dimethyl-5-methylene-1,3-dioxolan-2-one and 4,4-diethyl-5-methylene-1,3-dioxolan-2-one.

Besides the above-mentioned compounds, the unsaturated cyclic carbonic acid ester may also be catechol carbonate having a benzene ring or the like.

The halogenated carbonic acid ester is a cyclic or linear carbonic acid ester containing at least one halogen atom as a constituent element, and is, for example, a compound represented by formula (6) or (7). The content of the halogenated carbonic acid ester in the solvent is not particularly limited, and is, for example, 0.01 to 10% by weight.

(wherein R18 to R21 independently represent any one group selected from a hydrogen group, a halogen group, an alkyl group and a halogenated alkyl group, wherein at least one of R18 to R21 represents any one group selected from a halogen group and a halogenated alkyl group; and R22 to R27 independently represent any one group selected from a hydrogen group, a halogen group, an alkyl group and a halogenated alkyl group, wherein at least one of R22 to R27 represents any one group selected from a halogen group and a halogenated alkyl group).

The compound represented by formula (6) is a cyclic halogenated carbonic acid ester. R18 to R21 may be the same group as one another, or may be different groups from one another. As a matter of course, some of R18 to R21 may be the same group as each other.

The type of the halogen group is not particularly limited, and preferably includes at least one group selected from a fluorine group, a chlorine group, a bromine group and an iodine group, more preferably a fluorine group. The number of the halogen groups may be 1, or may be 2 or more.

The details about the alkyl group are as mentioned above. The halogenated alkyl group is a group in which at least one hydrogen group in an alkyl group is substituted (halogenated) by a halogen group. The details about the halogen group are as mentioned above.

Specific examples of the cyclic halogenated carbonic acid ester include compounds respectively represented by formulae (6-1) to (6-21) and also include geometric isomers thereof. Particularly, 4-fluoro-1,3-dioxolan-2-one which is represented by formula (6-1) and 4,5-difluoro-1,3-dioxolan-2-one which is represented by formula (6-3) are preferred. A trans isomer of 4,5-difluoro-1,3-dioxolan-2-one is more preferred than a cis isomer thereof. This is because the trans isomer is more easily available and can achieve a higher effect.

[formula(6-1) to (6-21)]
(6-1) 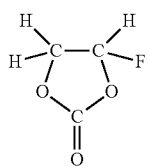
(6-2) 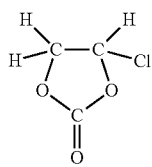
(6-3) 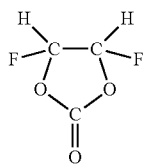
(6-4) 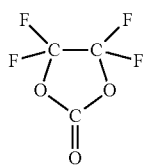
(6-5) 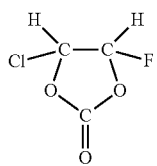
(6-6) 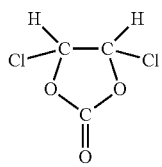
(6-7) 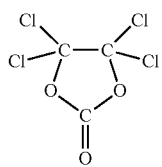
(6-8) 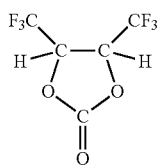
(6-9) 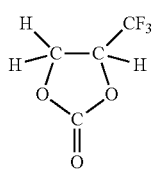
(6-10) 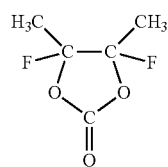
(6-11) 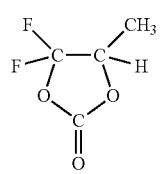
(6-12) 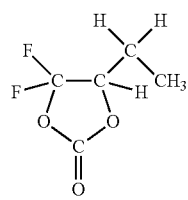
(6-13) 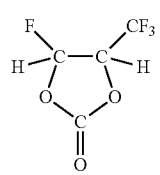
(6-14) 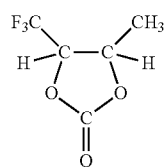
(6-15) 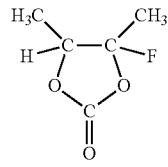
(6-16) 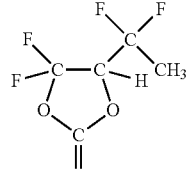
(6-17) 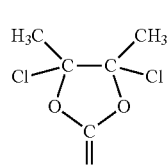
(6-18) 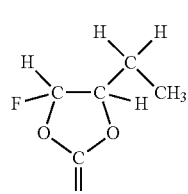

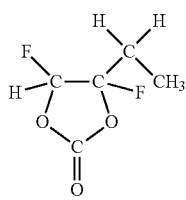
(6-19)

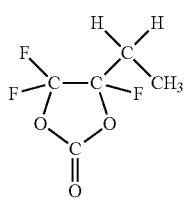
(6-20)

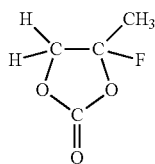
(6-21)

The compound represented by formula (7) is a linear halogenated carbonic acid ester. R22 to R27 may be the same group as one another, or may be different groups from one another. As a matter of course, some of R22 to R27 may be the same group as each other.

Specific examples of the linear halogenated carbonic acid ester include fluoromethyl methyl carbonate, bis(fluoromethyl) carbonate and difluoromethyl methyl carbonate.

The sulfonic acid ester includes, for example, a monosulfonic acid ester and a disulfonic acid ester. The content of the sulfonic acid ester in the solvent is not particularly limited, and is, for example, 0.01 to 10% by weight.

The monosulfonic acid ester may be a cyclic monosulfonic acid ester or a linear monosulfonic acid ester. Specific examples of the cyclic monosulfonic acid ester include sultones such as 1,3-propane sultone and 1,3-propene sultone. Specific examples of the linear monosulfonic acid ester include compounds each formed by disrupting a cyclic monosulfonic acid ester in the middle.

The disulfonic acid ester may be a cyclic disulfonic acid ester or a linear disulfonic acid ester. Specific examples of the cyclic disulfonic acid ester include compounds respectively represented by formulae (8-1) to (8-3) shown below. Specific examples of the linear disulfonic acid ester include compounds in each of which a cyclic disulfonic acid ester is disrupted in the middle.

[formula (8-1) to (8-3)]

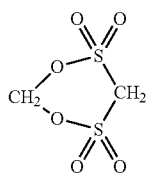
(8-1)

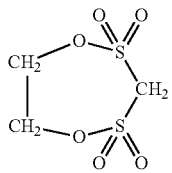
(8-2)

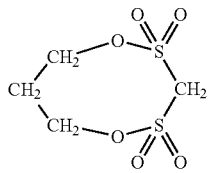
(8-3)

The acid anhydride is, for example, a carboxylic acid anhydride, a disulfonic acid anhydride or a carboxylic acid sulfonic acid anhydride. The content of the acid anhydride in the solvent is not particularly limited, and is, for example, 0.01 to 10% by weight.

Specific examples of the carboxylic acid anhydride include succinic anhydride, glutaric anhydride and maleic anhydride. Specific examples of the disulfonic acid anhydride include ethanedisulfonic anhydride and propanedisulfonic anhydride. Specific examples of the carboxylic acid sulfonic acid anhydride include sulfobenzoic anhydride, sulfopropionic anhydride and sulfobutyric anhydride.

The dinitrile compound includes at least one compound represented by formula (9). The content of the dinitrile compound in the solvent is not particularly limited, and is, for example, 0.1 to 10% by weight, preferably 0.5 to 2% by weight.

$$NC-R28-CN \qquad (9)$$

(wherein R28 represents any one group selected from a bivalent hydrocarbon group, a bivalent halogenated hydrocarbon group, a bivalent oxygen-containing group, a bivalent nitrogen-containing group, a bivalent sulfur-containing group, a bivalent phosphorus-containing group, and a bivalent group formed by bonding two or more of the aforementioned groups to each other).

Examples of the bivalent hydrocarbon group include, for example, an alkylene group, an alkenylene group, an alkynylene group, a cycloalkylene group, an arylene group or a bivalent group formed by bonding two or more of the aforementioned groups to each other (wherein the bivalent group is also referred to as a "bivalent bonded group", hereinafter). Specific examples of the bivalent hydrocarbon group include a methylene group (—$CH_2$—), a vinylene group (—CH=CH—), an ethynylene group (—C≡C—), a cyclohexylene group and a phenylene group.

The bivalent halogenated hydrocarbon group is a group in which at least one hydrogen group in the above-mentioned bivalent hydrocarbon group is substituted by a halogen group. A specific example of the monovalent halogenated hydrocarbon group is a perfluoromethylene group (—$CF_2$—).

The bivalent oxygen-containing group is a bivalent group which contains an oxygen atom as a constituent element. Specific examples of the bivalent oxygen-containing group include an ether group (—O—), an ester group (—COO—), a carbonyl group (—CO—) and an epoxy group (—COC—). The bivalent oxygen-containing group may also be, for example, a bivalent group formed by bonding at least one group selected from the above-mentioned specific examples of the bivalent oxygen-containing group to at least one group selected from the above-mentioned specific examples of the bivalent hydrocarbon group and the bivalent halogenated hydrocarbon group (i.e., a bivalent oxygen-containing linking group). The details about the bivalent hydrocarbon group and the bivalent halogenated hydrocarbon group are as mentioned above. Specific examples of the bivalent hydrocarbon group and the bivalent halogenated hydrocarbon group include a methylene group (—$CH_2$—), a vinylene group (—CH=CH—), an ethynylene group (—C≡C—), a cycloalkylene group, a phenylene group and a perfluoromethylene group (—$CF_2$—). A specific example of the bivalent oxygen-containing linking group is an alkyl ether group (—R201-O—R202-: wherein R201 and R202 independently represent a bivalent hydrocarbon group).

The bivalent nitrogen-containing group is a bivalent group containing a nitrogen atom as a constituent element. Specific examples of the bivalent nitrogen-containing group include an amide group (—NHCO—), a carbamate group (—NHCOO—), an amine group (—$NH_2$—), an azo group (—N=N—), a diazo group (—C=$N_2$—) and a diimide group (—N=C=N—). The bivalent nitrogen-containing group may also be a bivalent group formed by bonding at least one group selected from the above-mentioned specific examples of the bivalent nitrogen-containing group to at least one group selected from the above-mentioned specific examples of the bivalent hydrocarbon group and the bivalent halogenated hydrocarbon group (i.e., a bivalent nitrogen-containing linking group). The details about the bivalent hydrocarbon group and the bivalent halogenated hydrocarbon group are as mentioned above. Specific examples of the bivalent hydrocarbon group and bivalent halogenated hydrocarbon group include a methylene group, a vinylene group, an ethynylene group, a cycloalkylene group, a phenylene group and a perfluoromethylene group. A specific example of the bivalent nitrogen-containing linking group is an alkylamine group (—R203—$NH_2$—R204-: wherein R203 and R204 independently represent a bivalent hydrocarbon group).

The bivalent sulfur-containing group is a bivalent group containing a sulfur atom as a constituent element. Specific examples of the bivalent sulfur-containing group include a sulfonyl group (—$SO_2$—), a sulfide group (—S—) and a disulfide group (—S—S—). The bivalent sulfur-containing group may also be a bivalent group formed by bonding at least one group selected from the above-mentioned specific examples of the bivalent sulfur-containing group to at least one group selected from the specific examples of the bivalent hydrocarbon group and the bivalent halogenated hydrocarbon group (i.e., a bivalent sulfur-containing linking group). The details about the bivalent hydrocarbon group and the bivalent halogenated hydrocarbon group are as mentioned above. Specific examples of the bivalent hydrocarbon group and the bivalent halogenated hydrocarbon group include a methylene group, a vinylene group, an ethynylene group, a cycloalkylene group, a phenylene group and a perfluoromethylene group. A specific example of the bivalent sulfur-containing linking group is an alkylsulfonyl group (—R205-$SO_2$—R206-: wherein R205 and R206 independently represent a bivalent hydrocarbon group).

The bivalent phosphorus-containing group is a bivalent group containing a phosphorus (P) atom as a constituent element. A specific example of the bivalent phosphorus-containing group is a phosphatidyl group (—R207-$PO_4$—: wherein R207 represents a bivalent hydrocarbon group). The bivalent phosphorus-containing group may also be a bivalent group formed by bonding at least one group selected from the above-mentioned specific examples of the bivalent phosphorus-containing group to at least one group selected from the above-mentioned specific examples of the bivalent hydrocarbon group and the bivalent halogenated hydrocarbon group (i.e., a bivalent phosphorus-containing linking group). The details about the bivalent hydrocarbon group and the bivalent halogenated hydrocarbon group are as mentioned above. Specific examples of the bivalent hydrocarbon group and the bivalent halogenated hydrocarbon group include a methylene group, a vinylene group, an ethynylene group, a cycloalkylene group, a phenylene group and a perfluoromethylene group. A specific example of the bivalent phosphorus-containing linking group is an alkylphosphatidyl group (—R207-$PO_4$—R208-: wherein R208 represents a bivalent hydrocarbon group).

Specific examples of the dinitrile compound include succinonitrile (NC—$C_2H_4$—CN), glutaronitrile (NC—$C_3H_6$—CN), adiponitrile (NC—$C_4H_8$—CN) and phthalonitrile (NC—$C_6H_5$—CN).

The diisocyanate compound is, for example, a compound represented by formula: OCN—$C_nH_{2n}$—NCO (wherein n represents an integer of 1 or more). The content of the diisocyanate compound in the solvent is not particularly limited, and is, for example, 0.1 to 10% by weight. A specific example of the diisocyanate compound is OCN—$C_6H_{12}$—NCO.

The "other material" includes at least one electrolyte salt such as a lithium salt. The electrolyte salt may additionally include a salt other than a lithium salt. The salt other than a lithium salt is, for example, a salt of a light metal other than lithium.

Specific examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) and lithium bromide (LiBr).

Particularly, at least one compound selected from lithium hexafluorophosphate, lithium tetrafluoroborate, lithium perchlorate and lithium hexafluoroarsenate is preferred, and lithium hexafluorophosphate is more preferred. This is because the internal resistance can be decreased.

The electrolyte salt may also be at least one compound selected from compounds respectively represented by formulae (10) to (12). R41 and R43 may be the same group as one another, or may be different groups from one another. R51 to R53 may be the same group as one another, or may be different groups from one another. As a matter of course, some of R51 to R53 may be the same group as each other, or may be different groups from each other. R61 and R62 may be the same group as each other, or may be different groups from each other.

[formula (10)]

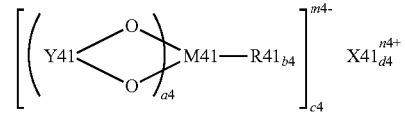

(10)

(wherein X41 represents any one element selected from elements belonging to Groups 1 and 2 on the long-period periodic table and aluminum (Al); M41 represents any one element selected from transition metals and elements belonging to Groups 13, 14 and 15 on the long-period periodic table; R41 represents a halogen group; Y41 represents any one group selected from —C(=O)—R42-C(=O)—, —C(=O)—CR43$_2$— and —C(=O)—C(=O)—, wherein R42 represents any one group selected from an alkylene group, a halogenated alkylene group, an arylene group and a halogenated arylene group, and R43 represents any one group selected from an alkyl group, a halogenated alkyl group, an aryl group and a halogenated aryl group; a4 represents an integer of 1 to 4; b4 represents an integer of 0, 2 or 4; and c4, d4, m4 and n4 independently represent an integer of 1 to 3).

[formula (11)]

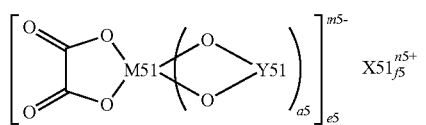

(11)

(wherein X51 represents any one element selected from elements belonging to Groups 1 and 2 on the long-period periodic table; M51 represents any one element selected from transition metals, and elements belonging to Groups 13, 14 and 15 on the long-period periodic table; Y51 represents any one group selected from —C(=O)—(CR51$_2$)$_{b5}$—C(=O)—, —R53$_2$C—(CR52$_2$)$_{c5}$—C(=O)—, —R53$_2$C—(CR52$_2$)$_{c5}$—CR53$_2$—, —R53$_2$C—(CR52$_2$)$_{c5}$—S(=O)$_2$—, —S(=O)$_2$—(CR52$_2$)$_{d5}$—S(=O)$_2$— and —C(=O)—(CR52$_2$)$_{d5}$—S(=O)$_2$—, wherein R51 and R53 independently represent any one group selected from a hydrogen group, an alkyl group, a halogen group and a halogenated alkyl group provided that at least one of R51's represents any one group selected from a halogen group and a halogenated alkyl group and at least one of R53's represents any one group selected from a halogen group and a halogenated alkyl group, and R52 represents any one group selected from a hydrogen group, an alkyl group, a halogen group and a halogenated alkyl group; a5, e5 and n5 independently represent an integer of 1 or 2; b5 and d5 independently represent an integer of 1 to 4; c5 represents an integer of 0 to 4; and f5 and m5 independently represent an integer of 1 to 3).

[formula (12)]

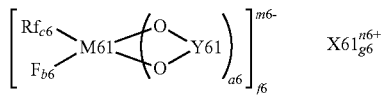

(12)

(wherein X61 represents any one element selected from elements belonging to Groups 1 and 2 on the long-period periodic table; M61 represents any one element selected from transition metals and elements belonging to Groups 13, 14 and 15 on the long-period periodic table; Rf represents any one group selected from a fluorinated alkyl group and a fluorinated aryl group, wherein the number of carbon atoms in each of the fluorinated alkyl group and the fluorinated aryl group is 1 to 10; Y61 represents any one group selected from —C(=O)—(CR61$_2$)$_{d6}$—C(=O)—, —R62$_2$C—(CR61$_2$)$_{d6}$—C(=O)—, —R62$_2$C—(CR61$_2$)$_{d6}$—CR62$_2$-, —R62$_2$C—(CR61$_2$)$_{d6}$—S(=O)$_2$—, —S(=O)$_2$—(CR61$_2$)$_{e6}$—S(=O)$_2$— and —C(=O)—(CR61$_2$)$_{e6}$—S(=O)$_2$—, wherein R61 represents any one group selected from a hydrogen group, an alkyl group, a halogen group and a halogenated alkyl group. R62 represents any one group selected from a hydrogen group, an alkyl group, a halogen group and a halogenated alkyl group, and at least one of R62's represents any one group selected from a halogen group and a halogenated alkyl group; a6, f6 and n6 independently represent an integer of 1 or 2; b6, c6 and e6 independently represent an integer of 1 to 4; d6 represents an integer of 0 to 4; and g6 and m6 independently represent an integer of 1 to 3).

In this regard, the element belonging to Group 1 includes hydrogen (H), lithium (Li), sodium (Na), potassium (K), rubidium (Rb), cesium (Cs) and francium (Fr). The element belonging to Group 2 includes beryllium (Be), magnesium (Mg), calcium (Ca), strontium (Sr), barium (Ba) and radium (Ra). The element belonging to Group 13 includes boron (B), aluminum (Al), gallium (Ga), indium (In) and thallium (Tl). The element belonging to Group 14 includes carbon (C), silicon (Si), germanium (Ge), tin (Sn) and lead (Pb). The element belonging to Group 15 includes nitrogen (N), phosphorus (P), arsenic (As), antimony (Sb) and bismuth (Bi).

Specific examples of the compound represented by formula (10) include compounds respectively represented by formulae (10-1) to (10-6) shown below. Specific examples of the compound represented by formula (11) include compounds respectively represented by formulae (11-1) to (11-8) shown below. Specific examples of the compound represented by formula (12) include compounds represented by formula (12-1) shown below.

[formula (10-1) to (10-6)]

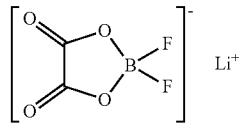

(10-1)

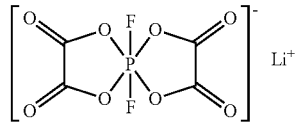

(10-2)

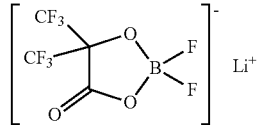

(10-3)

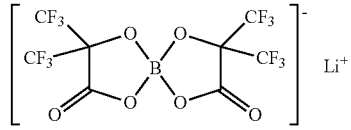

(10-4)

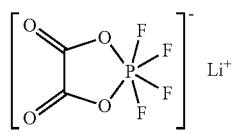

(10-5)

-continued

[formula (11-1) to (11-8)]

(11-1) 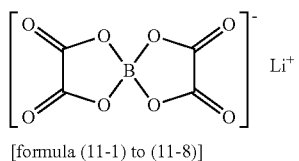

(11-2) 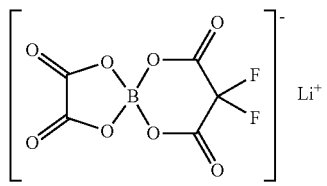

(11-3) 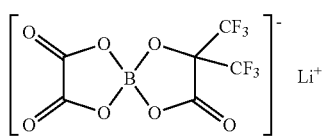

(11-4) 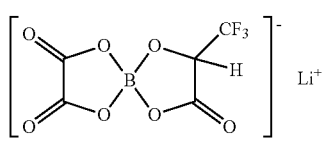

(11-5) 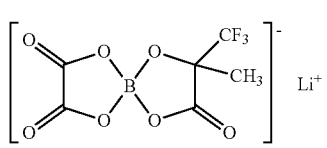

(11-6) 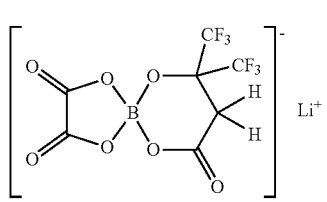

(11-7) 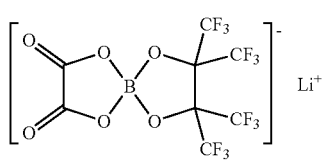

(11-8) 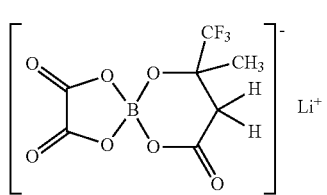

[formula (12-1)]

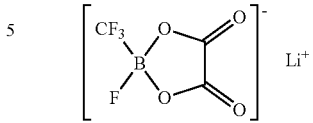  (12-1)

The electrolyte salt may also include at least one compound selected from compounds respectively represented by formulae (13) to (15). m and n may be the same value as each other, or may be different values from each other. p, q and r may be the same value as one another, or may be different values from one another. As a matter of course, some of p, q and r may be the same value as each other.

$$LiN(C_mF_{2m+1}SO_2)(C_nF_{2n+1}SO_2) \quad (13)$$

(wherein m and n independently represent an integer of 1 or more).

[formula (14)]

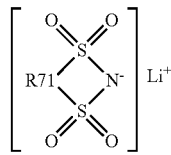  (14)

(wherein R71 represents a linear or branched perfluoroalkylene group having 2 to 4 carbon atoms).

$$LiC(C_pF_{2p+1}SO_2)(C_qF_{2q+1}SO_2)(C_rF_{2r+1}SO_2) \quad (15)$$

(wherein p, q and r independently represent an integer of 1 or more).

The compound represented by formula (13) is a linear imide compound. Specific examples of the linear imide compound include lithium bis(fluorosulfonyl)imide (LiN(SO$_2$F)$_2$), lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl) (pentafluoroethanesulfonyl)imide (LiN(CF$_3$SO$_2$)(C$_2$F$_5$SO$_2$)), lithium (trifluoromethanesulfonyl) (heptafluoropropanesulfonyl)imide (LiN(CF$_3$SO$_2$)(C$_3$F$_7$SO$_2$)) and lithium (trifluoromethanesulfonyl) (nonafluorobutanesulfonyl)imide (LiN(CF$_3$SO$_2$)(C$_4$F$_9$SO$_2$)).

The compound represented by formula (14) is a cyclic imide compound. Specific examples of the cyclic imide compound include compounds respectively represented by formulae (14-1) to (14-4) shown below.

[formula (14-1) to (14-4)]

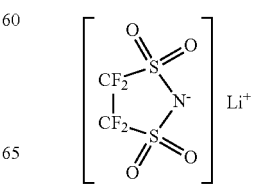  (14-1)

(14-2)

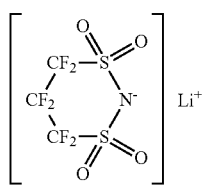

(14-3)

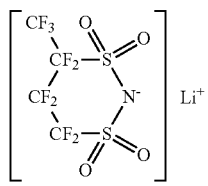

(14-4)

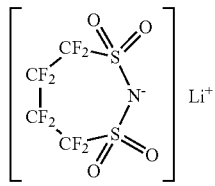

[formula (16-1) to (16-3)]

(16-1)

(16-2)

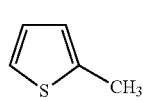

(16-3)

$H_3C$ $CH_3$

[formula (17-1) to (17-3)]

(17-1)

(17-2)

(17-3)

The compound represented by formula (15) is a linear methide compound. A specific example of the linear methide compound is lithium tris(trifluoromethanesulfonyl)methide $(LiC(CF_3SO_2)_3)$.

The content of the electrolyte salt is not particularly limited, and is preferably 0.3 to 3.0 mol/kg relative to the amount of the solvent. This is because high ion conductivity can be achieved.

The "other material" may include at least one material other than the above-mentioned materials. The material other than the above-mentioned materials is, for example, a phosphorus- and fluorine-containing salt such as lithium difluorophosphate $(LiPF_2O_2)$ and lithium fluorophosphate $(Li_2PFO_3)$. The content of the phosphorus- and fluorine-containing salt in the electrolytic solution is not particularly limited.

According to the electrolytic solution, the above-mentioned heterocyclic compound is contained. In this case, the chemical stability of the electrolytic solution can be improved and therefore the occurrence of a decomposition reaction of the electrolytic solution during charging and discharging can be prevented compared with the case where the electrolytic solution contains no heterocyclic compound and the case where the electrolytic solution contains another compound. As a result, the battery characteristics of a secondary battery using the electrolytic solution can be improved.

The above-mentioned "another compound" is a compound that does not correspond to a heterocyclic compound. Specific examples of a compound that does not correspond to the first heterocyclic compound include compounds respectively represented by formulae (16-1) to (16-3) shown below. Specific examples of a compound that does not correspond to the second heterocyclic compound include compounds respectively represented by formulae (17-1) to (17-3) shown below.

Particularly with respect to formula (1) that relates to the first heterocyclic compound, when each of at least two of R1 to R4 represents a perfluoroalkyl group, more specifically each of R1 and R4 represents a perfluoroalkyl group, the reactivity of the first heterocyclic compound is improved and a higher effect can be achieved. In this case, when the number of carbon atoms in the perfluoroalkyl group is 1 to 10, the compatibility, solubility and the like of the first heterocyclic compound can be secured.

Furthermore, in formula (1) that represents the first heterocyclic compound, when at least one of R1 to R4 represents a cyano group, more specifically each of R1 and R4 represents a cyano group, the reactivity of the first heterocyclic compound is improved and a higher effect can be achieved.

In formula (2) which represents the second heterocyclic compound, when each of at least two of R5 to R8 represents a perfluoroalkyl group, more specifically each of R5 and R8 represents a perfluoroalkyl group, the reactivity of the second heterocyclic compound is improved and a higher effect can be achieved. In this case, when the number of carbon atoms in the perfluoroalkyl group is 1 to 10, the compatibility, solubility and the like of the second heterocyclic compound can be secured.

When the electrolytic solution contains at least one compound selected from an unsaturated cyclic carbonic acid ester and a halogenated carbonic acid ester, a synergistic effect between the unsaturated cyclic carbonic acid ester or the like and the heterocyclic compound can be produced and therefore the occurrence of a decomposition reaction of the electrolytic solution can be prevented more effectively. As a result, a higher effect can be obtained.

When the electrolytic solution contains at least one dinitrile compound, a synergistic effect between the dinitrile compound and the heterocyclic compound can be produced and therefore the occurrence of a decomposition reaction of the electrolytic solution can be prevented more effectively. As a result, a higher effect can be obtained.

Next, a secondary battery using the above-mentioned electrolytic solution will be described.

Figure 2:
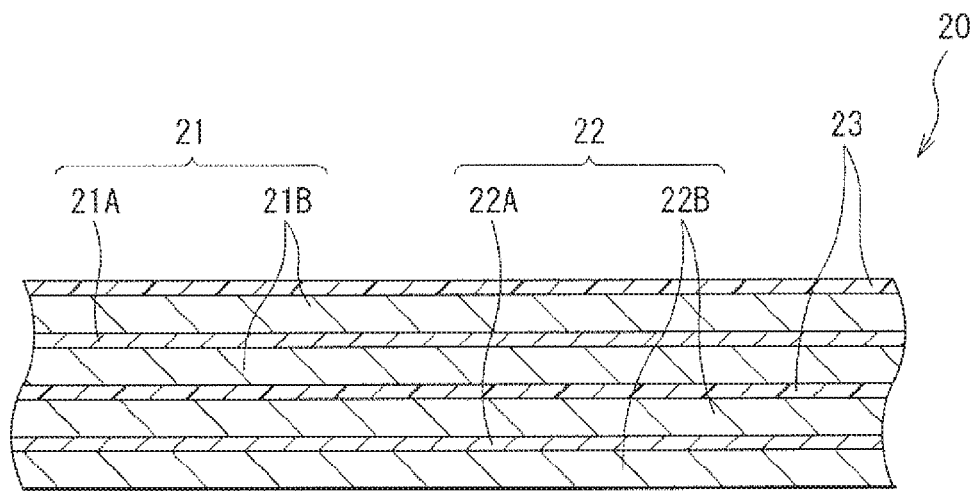
FIG. 2 is a cross-sectional view illustrating an enlarged view of a part of a wound electrode body shown in FIG. 1.

FIG. 1 shows a cross-sectional constitution of a secondary battery, and FIG. 2 shows an enlarged view of a cross-sectional constitution of a part of a wound electrode body 20 shown in FIG. 1.

The secondary battery described in this section is a lithium ion secondary battery in which the capacity of a negative electrode 22 can be obtained by, for example, the storage/release of lithium that is an electrode reactive substance.

The secondary battery has a so-called "cylindrical battery structure", and a pair of insulating plates 12 and 13 and the wound electrode body 20 that is a battery element are housed in a hollow columnar battery can 11 as shown in, for example, FIG. 1. In the wound electrode body 20, a positive electrode 21 and the negative electrode 22 are laminated on each other with a separator 23 interposed therebetween and then the positive electrode 21, the negative electrode 22 and the separator 23 are wound together, for example. The wound electrode body 20 is impregnated with an electrolytic solution that is a liquid electrolyte.

The battery can 11 has such a hollow structure that, for example, one end is closed and the other end is opened. The battery can 11 contains at least one material selected from iron, aluminum and alloys thereof, for example. The surface of the battery can 11 may be plated with nickel or the like. The pair of insulating plates 12 and 13 is arranged so as to sandwich the wound electrode body 20 and extend vertically relative to the wound periphery of the wound electrode body 20.

A battery lid 14, a safety valve mechanism 15 and a heat-sensing resistive element (positive temperature coefficient (PTC) element) 16 are crimped to the open end of the battery can 11 via a gasket 17. In this manner, the battery can 11 is hermetically sealed. The battery lid 14 is made from, for example, the same material as that for the battery can 11. The safety valve mechanism 15 and the heat-sensing resistive element 16 are arranged inside of the battery lid 14, and the safety valve mechanism 15 is electrically connected to the battery lid 14 through the heat-sensing resistive element 16. In the safety valve mechanism 15, a disk plate 15A can be inverted when the internal pressure of the battery becomes equal to or larger than a predetermined value in association with the occurrence of internal short circuit or heating from the outside. As a result, the electric connection between the battery lid 14 and the wound electrode body 20 is disconnected. In order to prevent the abnormal heat generation caused by a high current, the resistance of the heat-sensing resistive element 16 can increase with the increase in temperature. The gasket 17 is made from, for example, an insulating material, and asphalt or the like may be applied on the surface of the gasket 17.

At the winding center of the wound electrode body 20, a center pin 24, for example, is inserted. The center pin 24 may not be inserted at the winding center of the wound electrode body 20. A positive electrode lead 25 is attached to the positive electrode 21, and a negative electrode lead 26 is attached to the negative electrode 22. The positive electrode lead 25 contains, for example, a conductive material such as aluminum. The positive electrode lead 25 is attached to, for example, the safety valve mechanism 15 and is electrically connected to the battery lid 14. The negative electrode lead 26 contains, for example, a conductive material such as nickel. The negative electrode lead 26 is attached to, for example, the battery can 11 and is electrically connected to the battery can 11.

The positive electrode 21 includes, for example, a positive electrode current collector 21A and positive electrode active material layers 21B respectively provided on both surfaces of the positive electrode current collector 21A, as shown in FIG. 2. The positive electrode active material layer 21B may be provided on only one surface of the positive electrode current collector 21A.

The positive electrode current collector 21A contains, for example, at least one conductive material. The type of the conductive material is not particularly limited. For example, the conductive material is a metallic material such as aluminum, nickel and a stainless steel. The positive electrode current collector 21A may have a monolayer structure or a multilayer structure.

The positive electrode active material layer 21B contains, as a positive electrode active material, at least one positive electrode material capable of storing/releasing lithium. The positive electrode active material layer 21B may further contain at least one another material, such as a positive electrode binder and a positive electrode conducting agent, in addition to the positive electrode active material.

The positive electrode material is preferably a lithium-containing compound, more specifically one or both of a lithium-containing composite oxide and a lithium-containing phosphoric acid compound. This is because a high energy density can be achieved.

The lithium-containing composite oxide is an oxide that contains lithium and at least one another element (element other than lithium) as constituent elements. The lithium-containing composite oxide has, for example, at least one type of crystal structure, such as a layered rock salt-type crystal structure and a spinel-type crystal structure. The lithium-containing phosphoric acid compound is a phosphoric acid compound that contains a lithium atom and at least one another element as constituent elements, and has a crystal structure such as an olivine-type crystal structure.

The type of the "another element" is not particularly limited, and includes at least one arbitrary element. Particularly, the "another element" preferably includes at least one element selected from elements belonging to Groups 2 to 15 on the long-period periodic table. More specifically, the "another element" is more preferably at least one metal element selected from nickel (Ni), cobalt (Co), manganese (Mn) and iron (Fe). This is because a high voltage can be achieved.

Examples of the lithium-containing composite oxide having a layered rock salt-type crystal structure include compounds respectively represented by formulae (21) to (23).

$$Li_aMn_{(1-b-c)}Ni_bM11_cO_{(2-d)}F_e \qquad (21)$$

(wherein M11 represents at least one element selected from cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W); and a to e satisfy the requirements represented by formulae 0.8≤a≤1.2, 0<b<0.5, 0≤c≤0.5, (b+c)<1, −0.1≤d≤0.2 and 0≤e≤0.1; wherein the content of lithium varies depending on whether the secondary battery is in a charged state or a discharged state, and a represents a value in the case where the secondary battery is in a completely discharged state).

$$Li_aNi_{(1-b)}M12_bO_{(2-c)}F_d \qquad (22)$$

(wherein M12 represents at least one element selected from cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and a to d satisfy the requirements represented by formulae $0.8 \leq a \leq 1.2$, $0.005 \leq b \leq 0.5$, $-0.1 \leq c \leq 0.2$ and $0 \leq d \leq 0.1$; wherein the content of lithium varies depending on whether the secondary battery is in a charged state or a discharged state, and a represents a value in the case where the secondary battery is in a completely discharged state).

$$Li_aCO_{(1-b)}M13_bO_{(2-c)}F_d \quad (23)$$

(wherein M13 represents at least one element selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and a to d satisfy the requirements represented by formulae $0.8 \leq a \leq 1.2$, $0 \leq b < 0.5$, $-0.1 \leq c \leq 0.2$ and $0 \leq d \leq 0.1$; wherein the content of lithium varies depending on whether the secondary battery is in a charged state or a discharged state, and a represents a value in the case where the secondary battery is in a completely discharged state).

Specific examples of the lithium-containing composite oxide having a layered rock salt-type crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.05}Al_{0.05}O_2$, $LiNi_{0.33}Co_{0.33}Mn_{0.33}O_2$, $Li_{1.2}Mn_{0.52}Co_{0.175}Ni_{0.1}O_2$ and $Li_{1.15}(Mn_{0.65}Ni_{0.22}Co_{0.13})O_2$.

In the case where the lithium-containing composite oxide having a layered rock salt-type crystal structure contains nickel, cobalt, manganese and aluminum as the constituent elements thereof, the atomic ratio of nickel is preferably 50 at. % or more. This is because a high energy density can be achieved.

An example of the lithium-containing composite oxide having a spinel-type crystal structure is a compound represented by formula (24) shown below.

$$Li_aMn_{(2-b)}M14_bO_cF_d \quad (24)$$

(wherein M14 represents at least one element selected from cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and a to d satisfy the requirements represented by formulae $0.9 \leq a \leq 1.1$, $0 \leq b \leq 0.6$, $3.7 \leq c \leq 4.1$ and $0 \leq d \leq 0.1$; wherein the content of lithium varies depending on whether the secondary battery is in a charged state or a discharged state, and a represents a value in the case where the secondary battery is in a completely discharged state).

A specific example of the lithium-containing composite oxide having a spinel-type crystal structure is $LiMn_2O_4$.

An example of the lithium-containing phosphoric acid compound having an olivine-type crystal structure is a compound represented by formula (25) shown below.

$$Li_aM15PO_4 \quad (25)$$

(wherein M15 represents at least one element selected from cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr); and a satisfies the requirement represented by formula $0.9 \leq a \leq 1.1$; wherein the content of lithium varies depending on whether the secondary battery is in a charged state or a discharged state, and a represents a value in the case where the secondary battery is in a completely discharged state).

Specific examples of the lithium-containing phosphoric acid compound having an olivine-type crystal structure include $LiFePO_4$, $LiMnPO_4$, $LiFe_{0.5}Mn_{0.5}PO_4$ and $LiFe_{0.3}Mn_{0.7}PO_4$.

The lithium-containing composite oxide may be a compound represented by formula (26) shown below, or the like.

$$(Li_2MnO_3)(LiMnO_2)_{1-x} \quad (26)$$

(wherein x satisfies the requirement represented by formula $0 \leq x \leq 1$; wherein the content of lithium varies depending on whether the secondary battery is in a charged state or a discharged state, and x represents a value in the case where the secondary battery is in a completely discharged state).

In addition, the positive electrode material may include, for example, at least one component selected from an oxide, a disulfide, a chalcogenide and a conductive polymer. Specific examples of the oxide include titanium oxide, vanadium oxide and manganese dioxide. Specific examples of the disulfide include titanium disulfide and molybdenum sulfide. A specific example of the chalcogenide is niobium selenide. Specific examples of the conductive polymer include sulfur, polyaniline and polythiophene. The positive electrode material may be a material other than the above-mentioned substances.

In order to improve the electrical stability of the positive electrode active material, the positive electrode material may be coated with a coating layer.

The coating layer coats a portion or the entire of the surface of each of lithium-containing compound particles (e.g., lithium-containing composite oxide particles) that are core particles (positive electrode material). The coating layer contains constituent elements that are different from those for the lithium-containing compound, or contains constituent elements at a different compositional ratio from that for the lithium-containing compound.

More specifically, the coating layer contains, for example, at least one component selected from an oxide, a transition metal compound and the like. The oxide is, for example, an oxide containing lithium (Li) and one or both of nickel (Ni) and manganese (Mn) as constituent elements. The transition metal compound is, for example, a compound containing at least one element selected from nickel (Ni), cobalt (Co), manganese (Mn), iron (Fe), aluminum (Al), magnesium (Mg) and zinc (Zn), and oxygen (O) and phosphorus (P) as constituent elements. In addition, the coating layer may also contain a halide such as lithium fluoride, or may also contain a chalcogenide other than oxygen. The materials for forming the coating layer are not limited to the above-mentioned materials, and may be another material.

In order to determine whether or not the positive electrode material is coated with the coating layer, it is preferred to examine the change in concentration of a constituent element in a direction from the surface of the positive electrode active material toward the inside of the positive electrode active material by, for example, analyzing the positive electrode active material employing at least one method selected from arbitrary analysis methods. In the examination of the change in concentration, the chemical composition of the positive electrode active material is measured employing at least one method such as auger electron spectroscopy (AES) and secondary ion mass spectrometry (TOF-SIMS) while scraping the positive electrode active material employing a sputtering method or the like, for example. Alternatively, in the examination of the change in concentration, a component eluted from the positive electrode active material may be measured over time employing at least one method selected from inductively coupled plasma spectrometry (ICP) and the like while dissolving the positive electrode active material gradually in an acidic solution.

The method for forming the coating layer is not particularly limited. More specifically, a mechano-fusion process may be employed for the formation of the coating layer. In this case, a raw material (a material for forming the coating layer) is attached to the surface of the positive electrode material using a device capable of applying a compressive shear stress and then the positive electrode material having the raw material attached thereon is treated with heat, for example. Alternatively, for the formation of the coating layer, a neutralization titration method or the like may be used. In this case, a hydroxide which can serve as a precursor of the coating layer is attached onto the surface of the positive electrode material and then the positive electrode material having the hydroxide attached thereon is treated with heat.

The surface of each of the lithium-containing compound particles which are core particles (positive electrode material) may be coated with a plurality of microparticles of a lithium-containing compound. Namely, the positive electrode active material may be coated particles (i.e., composite particles) in which the surface of each of the core particles is coated with a plurality of microparticle (i.e., composite particles).

The positive electrode active material may contain only the coated particles, or may contain only the uncoated core particles each of which is not coated with a plurality of microparticles (uncoated particles), or may contain both of the coated particles and the uncoated particles. As a matter of course, the coated particles may be composed of a single type of coated particles or two or more types of coated particles. The uncoated particles may also be composed of a single type of uncoated particles or two or more types of uncoated particles.

The positive electrode binder includes, for example, at least one component selected from a synthetic rubber, a polymeric compound and others. Specific examples of the synthetic rubber include a styrene butadiene-type rubber, a fluorine-based rubber and an ethylene propylene diene. Specific examples of the polymeric compound include poly(vinylidene fluoride) and polyimide.

The positive electrode conducting agent includes, for example, at least one compound selected from a carbon material and the like. Specific examples of the carbon material include graphite, carbon black, acetylene black and Ketjen black. The positive electrode conducting agent may be a material having electric conductivity, such as a metallic material and a conductive polymer.

The negative electrode 22 includes, for example, a negative electrode current collector 22A and negative electrode active material layers 22B respectively provided on both surfaces of the negative electrode current collector 22A, as shown in FIG. 2. The negative electrode active material layer 22B may be provided on only one surface of the negative electrode current collector 22A.

The negative electrode current collector 22A contains, for example, at least one conductive material. The type of the conductive material is not particularly limited, and the conductive material may be a metallic material such as copper, aluminum, nickel and a stainless steel. The negative electrode current collector 22A may have a monolayer structure or a multilayer structure.

The surface of the negative electrode current collector 22A is preferably roughened. This is because the close adhesiveness of the negative electrode active material layer 22B to the negative electrode current collector 22A can be improved due to a so-called anchoring effect. In this case, only at least a portion of the surface of the negative electrode current collector 22A which faces the negative electrode active material layer 22B may be roughened. An example of the method for the roughening is a method in which microparticles are formed by employing an electrolysis treatment. In the electrolysis treatment, microparticles are formed on the surface of the negative electrode current collector 22A in an electrolysis vessel by the electrolysis method. Therefore, protrusions and depressions are formed on the surface of the negative electrode current collector 22A. A copper foil formed by the electrolysis method is generally called "an electrolytic copper foil".

The negative electrode active material layer 22B contains, as a negative electrode active material, at least one negative electrode material that can store/release lithium. The negative electrode active material layer 22B may further contain at least one of other materials including a negative electrode binder and a negative electrode conducting agent, in addition to the negative electrode active material.

In order to prevent the accidental deposition of metal lithium on the negative electrode 22 during charging, it is preferred that the chargeable capacity of the negative electrode material is larger than the discharge capacity of the positive electrode 21. Namely, it is preferred that the electrochemical equivalent of the negative electrode material capable of storing/releasing lithium be larger than that of the positive electrode 21.

The negative electrode material contains at least one carbon material. This is because the change in crystal structure of lithium during storage/release is very small and therefore a high energy density can be achieved steadily. This is also because the carbon material can also act as a negative electrode conducting agent and therefore the electric conductivity of the negative electrode active material layer 22B can be improved.

Specific examples of the carbon material include easily graphitizable carbon, hardly graphitizable carbon and graphite. It is preferred that the lattice spacing of (002) plane of hardly graphitizable carbon is 0.37 nm or more and the lattice spacing of (002) plane of graphite is 0.34 nm or less. More specific examples of the carbon material include a pyrolytic carbon-type substance, a coke-type substance, a glass-like carbon fiber, a fired organic polymeric compound, activated carbon and carbon black. The coke-type substance includes, within the scope thereof, pitch coke, needle coke and petroleum coke. The fired organic polymeric compound is a product produced by firing (carbonizing) a polymeric compound, e.g., a phenolic resin and a furan resin, at an appropriate temperature. In addition, the carbon material may be low crystalline carbon that is heat-treated at a temperature equal to or lower than about 1000° C., or may be amorphous carbon. The shape of the carbon material may be either one of a fiber-like form, a spherical form, a granular form and a scale-like form.

The negative electrode material is, for example, a material that contains at least one component selected from metal elements and metalloid elements as a constituent element (i.e., a metal-based material). This is because a high energy density can be achieved.

The metal-based material may be any one of an element, an alloy and a compound, or a combination of two or more of them. The metal-based material may also be a material that contains a phase composed of at least one of an element, an alloy and a compound as at least a portion thereof. The alloy includes a material that contains at least two metal elements as constituent elements, as well as a material that contains at least one metal element and at least one metalloid element as constituent elements. The alloy may also contain a non-metal element. The texture of this metal-based material is, for example, a solid solution, a eutectic material (a eutectic mixture), an intermetallic compound and a coexistent substance of two or more of them.

For example, the metal element includes at least one metal element capable of forming an alloy in conjunction with lithium, and the metalloid element includes at least one metalloid element capable of forming an alloy in conjunction with lithium. Specific examples of the metal element and the metalloid element include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd) and platinum (Pt).

Among these metal elements, one or both of silicon and tin are preferred. This is because these elements have an excellent ability to store/release lithium and therefore a remarkably high energy density can be achieved.

The material containing one or both of silicon and tin as constituent elements may be any one of element silicon, a silicon alloy and a silicon compound, or element tin, a tin alloy and a tin compound, or a combination of two or more of these materials, or a material that contains a phase composed of at least one of these materials as at least a portion thereof. The term "element" as used herein refers to an element in a general sense (which may contain impurities in a trace amount), and does not necessarily means an element having a purity of 100%.

The silicon alloy contains, for example, at least one of tin, nickel, copper, iron, cobalt, manganese, zinc, indium, silver, titanium, germanium, bismuth, antimony, chromium and the like as a non-silicon constituent element. The silicon compound contains, for example, at least one of carbon, oxygen and the like as a non-silicon constituent element. The silicon compound may contain at least one of elements that are described with respect to the silicon alloy as a non-silicon constituent element.

Specific examples of the silicon alloy and the silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$) and LiSiO. v in $SiO_v$ may be one satisfying formula: $0.2<v<1.4$.

The tin alloy contains, for example, at least one element selected from silicon, nickel, copper, iron, cobalt, manganese, zinc, indium, silver, titanium, germanium, bismuth, antimony and chromium as a non-tin constituent element. The tin compound contains, for example, at least one element selected from carbon and oxygen as a non-tin constituent element. The tin compound may contain, for example, at least one element selected from the elements which are mentioned with respect to the tin alloy in the description, as a non-tin constituent element.

Specific examples of the tin alloy and the tin compound include $SnO_w$ ($0<w\leq2$), $SnSiO_3$, LiSnO and $Mg_2Sn$.

Particularly, the material containing tin as a constituent element is preferably a material that also contains, in addition to tin that is a first constituent element, a second constituent element and a third constituent element (i.e., an Sn-containing material). The second constituent element includes, for example, at least one element selected from cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth and silicon. The third constituent element includes, for example, at least one element selected from boron, carbon, aluminum and phosphorus. This is because a high battery capacity, an excellent cycle characteristic and the like can be achieved when the Sn-containing material further contains the second constituent element and the third constituent element.

Particularly, the Sn-containing material is preferably a material that contains tin, cobalt and carbon as the constituent elements thereof (i.e., an Sn—Co—C-containing material). In the Sn—Co—C-containing material, the content of carbon is, for example, 9.9 to 29.7% by mass and the content ratio between tin and cobalt (which represented by formula: Co/(Sn+Co)) is 20 to 70% by mass. This is because a high energy density can be achieved.

It is preferred that the Sn—Co—C-containing material has a phase containing tin, cobalt and carbon, wherein the phase is preferably low crystalline or amorphous. The phase is a phase capable of reacting with lithium (i.e., a reactive phase), and therefore excellent properties can be achieved due to the presence of the reactive phase. It is preferred that the half bandwidth (a diffraction angle: 2θ) of a diffraction peak of the reactive phase as measured by X-ray diffraction is 1° or more when CuKα line is used as a specific X-ray and the scanning rate is 1°/min. This is because lithium can be stored/released more smoothly and the reactivity with the electrolytic solution can be reduced. In addition to the low crystalline or amorphous phase, the Sn—Co—C-containing material may also contain a phase that contains elements of the constituent elements thereof or some of the elements.

Whether or not a diffraction peak obtained by the X-ray diffraction corresponds to a reactive phase capable of reacting with lithium can be determined easily by comparing X-ray diffraction charts before and after the electrochemical reaction with lithium with each other. For example, when the position of a diffraction peak is shifted before and after the electrochemical reaction with lithium, it is determined that the diffraction peak corresponds to a reactive phase capable of reacting with lithium. In this case, a diffraction peak of the low crystalline or amorphous reactive phase appears at an angle 2θ between 20° to 50°, for example. It is considered that this reactive phase contains, for example, the above-mentioned constituent elements and becomes low crystalline or amorphous mainly due to the presence of carbon.

In the Sn—Co—C-containing material, it is preferred that at least some of carbon atoms, which are constituent elements, be bonded to the metal element or the metalloid element that is another constituent element. This is because the coagulation or crystallization of tin or the like can be prevented. The state of binding between the elements can be confirmed by employing, for example, an X-ray photoelectron spectroscopy (XPS). In a commercially available device, Al-Kα line, Mg-Kα line or the like is used as soft X-ray, for example. In the case where at least some of carbon atoms are bonded to a metal element, a metalloid or the like, the peak corresponding to an associated wave of 1s orbit (C1s) of a carbon atom appears in a region lower than 284.5 eV. In this regard, the peak corresponding to 4f orbit (Au4f) of a gold atom is energy-calibrated so as to appear at 84.0 eV. In general, a surface-contaminating carbon atom is present on the surface of a substance. Therefore, it is defined that the peak corresponding to C1s of the surface-contaminating carbon atom appears at 284.8 eV, and the peak is employed as an energy base. In the XPS measurement, the waveform of the peak corresponding to C1s can be defined in a form including a peak corresponding to the surface-contaminating carbon atom and a peak corresponding to a carbon atom contained in the Sn—Co—C-containing material. Therefore, the two peaks can be separated by, for example, the analysis using a commercially available software. In the analysis of a waveform, the position of a main peak appearing on the minimum binding energy side is employed as an energy base (284.8 eV).

The Sn—Co—C-containing material is not limited to a material (Sn—Co—C) that contains only tin, cobalt and carbon as the constituent elements. In addition to tin, cobalt and carbon, the Sn—Co—C-containing material may further contain, for example, at least one element selected from silicon, iron, nickel, chromium, indium, niobium, germanium, titanium, molybdenum, aluminum, phosphorus, gallium and bismuth and the like as a constituent element.

In addition to the Sn—Co—C-containing material, a material that contains tin, cobalt, iron and carbon as the constituent elements thereof (i.e., an Sn—Co—Fe—C-containing material) is also preferred. The chemical composition of the Sn—Co—Fe—C-containing material may be any one. As one example, in the case where it is intended to set the content of iron to a smaller amount, the content of carbon is 9.9 to 29.7% by mass, the content of iron is 0.3 to 5.9% by mass, and the content ratio between tin and cobalt (which is represented by formula: Co/(Sn+Co)) is 30 to 70% by mass. In the case where it is intended to set the content of iron to a larger amount, the content of carbon is 11.9 to 29.7% by mass, the content ratio among tin, cobalt and iron (which is represented by formula: (Co+Fe)/(Sn+Co+Fe)) is 26.4 to 48.5% by mass, and the content ratio between cobalt and iron (which is represented by formula: Co/(Co+Fe)) is 9.9 to 79.5% by mass. This is because a high energy density can be achieved when the chemical composition falls within the above-mentioned ranges. The physical properties (e.g., a half bandwidth) of the Sn—Co—Fe—C-containing material are the same as those of the Sn—Co—C-containing material.

Alternatively, the negative electrode material may also be, for example, at least one compound selected from a metal oxide and a polymeric compound. Specific examples of the metal oxide include iron oxide, ruthenium oxide and molybdenum oxide. Specific examples of the polymeric compound include polyacethylene, polyaniline and polypyrrole.

Particularly, it is preferred that the negative electrode material contains both of a carbon material and a metal-based material for the following reason.

A metal-based material, particularly a material containing one or both of silicon and tin as a constituent element or constituent elements, has an advantage of having a high theoretical capacity, while having the disadvantage of being intensively expanded or shrunk during charging and discharging. In contrast, the carbon material has the disadvantage of having a low theoretical capacity, while having the advantage of being unlikely to expand or shrink during charging and discharging. Therefore, by using both of the carbon material and the metal-based material in combination, it becomes possible to prevent the expansion or shrinkage of the negative electrode active material layer during charging and discharging and it also becomes possible to achieve a high theoretical capacity (in other words, a high battery capacity).

The negative electrode active material layer 22B can be formed by, for example, at least one method selected from a coating method, a vapor phase method, a liquid phase method, a thermal spraying method and a firing method (a sintering method). The coating method is, for example, a method in which a particulate (powdery) negative electrode active material is mixed with a negative electrode binder and the like, then the resultant mixture is dispersed in an organic solvent or the like, and then the resultant solution is applied onto the negative electrode current collector 22A. Examples of the vapor phase method include a physical deposition method and a chemical deposition method. More specific examples of the vapor phase method include a vacuum deposition method, a sputtering method, an ion plating method, a laser ablation method, a thermal chemical vapor deposition method, a chemical vapor deposition (CVD) method, and a plasma chemical vapor deposition method. Examples of the liquid phase method include an electrolytic plating method and an electroless plating method. The thermal spraying method is a method in which the negative electrode active material that is in a molten or half-molten state is sprayed onto the negative electrode current collector 22A. The firing method is, for example, a method in which a mixture dispersed in an organic solvent or the like is applied onto the negative electrode current collector 22A by a coating method and then the mixture is heat-treated at a temperature higher than the melting point of the negative electrode binder or the like. As the firing method, an atmospheric firing method, a reaction firing method, a hot-press firing method or the like can be employed.

In the secondary battery, as mentioned above, in order to prevent accidental deposition of lithium onto the negative electrode 22 during charging, the electrochemical equivalent of the negative electrode material that can store/release lithium is larger than that of the positive electrode. In the case where the open circuit voltage (i.e., battery voltage) upon being fully charged is 4.25 V or more, even if the same positive electrode active material is used, the release amount of lithium per unit mass increases compared with a case where the open circuit voltage is 4.20 V. Therefore, the amounts of the positive electrode active material and the negative electrode active material are adjusted depending on the released amount of lithium. As a result, a high energy density can be achieved.

The separator 23 is arranged between the positive electrode 21 and the negative electrode 22 as shown in, for example, FIG. 2. The separator 23 can separate the positive electrode 21 from the negative electrode 22 and enables lithium ions to pass while preventing the occurrence of short-circuiting caused as the result of the contact between the positive electrode 21 and the negative electrode 22.

The separator 23 includes, for example, at least one porous membrane made from a synthetic resin, a ceramic or the like, and may be a laminate membrane composed of at least two porous membranes. The synthetic resin is, for example, polytetrafluoroethylene, polypropylene or polyethylene.

Particularly, the separator 23 may include, for example, the above-mentioned porous membrane (base material layer) and a polymeric compound layer provided on one surface or both surfaces of the base material layer. This is because the close adhesiveness of the separator 23 to each of the positive electrode 21 and the negative electrode 22 can be improved and therefore the distortion of the wound electrode body 20 can be prevented. As a result, the occurrence of a decomposition reaction of the electrolytic solution can be prevented and the leakage of the electrolytic solution with which the base material layer is impregnated can also be prevented, and therefore the electric resistivity may rarely increase and the battery may be rarely swollen even when charge and discharge operations are repeated.

The polymeric compound layer contains a polymeric compound such as poly(vinylidene fluoride). This is because poly(vinylidene fluoride) has excellent physical strength and is electrochemically stable. The polymeric compound may be one other than poly(vinylidene fluoride). For the formation of the polymeric compound layer, a solution prepared by dissolving the polymeric compound in an organic solvent or the like is applied onto the base material layer and then the base material layer is dried, for example. It is also possible to immerse the base material layer in the solution and then dry the base material layer. The polymeric compound layer may contain at least one type of insulating particles such as inorganic particles. The type of the inorganic particles may be aluminum oxide, aluminum nitride or the like.

As mentioned above, the wound electrode body 20 is impregnated with an electrolytic solution. The electrolytic solution has the same composition as that of the electrolytic solution according to the present technology. Namely, the electrolytic solution contains a heterocyclic compound.

The secondary battery can be operated, for example, in the following manner.

During charging, lithium ions are released from the positive electrode 21, and the lithium ions are stored in the negative electrode 22 through the electrolytic solution. On the other hand, during discharging, lithium ions are released from the negative electrode 22, and the lithium ions are stored in the positive electrode 21 through the electrolytic solution.

The secondary battery can be produced by, for example, the following procedure.

For the production of the positive electrode 21, firstly a positive electrode active material is optionally mixed with a positive electrode binder, a positive electrode conducting agent and the like to produce a positive electrode mix. Subsequently, the positive electrode mix is dispersed in an organic solvent or the like to produce a paste-like positive electrode mix slurry. Subsequently, the positive electrode mix slurry is applied onto both surfaces of the positive electrode current collector 21A, and then the positive electrode mix slurry is dried to form the positive electrode active material layers 21B. Subsequently, the positive electrode active material layers 21B are compression-molded with a roll pressing machine or the like optionally while heating the positive electrode active material layers 21B. In this regard, the compression molding may be repeated a plurality of times.

For the production of the negative electrode 22, negative electrode active material layers 22B are formed respectively on both surfaces of the negative electrode current collector 22A by the same procedure as the above-mentioned procedure employed for the production of the positive electrode 21. More specifically, a negative electrode mix is prepared by mixing a negative electrode active material with a negative electrode binder, a negative electrode conducting agent and the like, and the negative electrode mix is dispersed in an organic solvent or the like to produce a paste-like negative electrode mix slurry. Subsequently, the negative electrode mix slurry is applied onto both surfaces of the negative electrode current collector 22A and is then dried to form the negative electrode active material layers 22B. Finally, the negative electrode active material layers 22B are compression-molded with a roll pressing machine or the like.

For the assembly of a secondary battery, the positive electrode lead 25 is attached to the positive electrode current collector 21A by a welding method or the like, and the negative electrode lead 26 is attached to the negative electrode current collector 22A by a welding method or the like. Subsequently, the positive electrode 21 and the negative electrode 22 are laminated with a separator 23 interposed therebetween, and the positive electrode 21, the negative electrode 22 and the separator 23 are wound to produce the wound electrode body 20. Subsequently, the center pin 24 is inserted to a winding center of the wound electrode body 20.

Subsequently, the wound electrode body 20 is housed in the battery can 11 while sandwiching the wound electrode body 20 between a pair of insulating plates 12 and 13. In this case, a tip part of the positive electrode lead 25 is attached to the safety valve mechanism 15 by a welding method or the like, and a tip part of the negative electrode lead 26 is attached to the battery can 11 by a welding method or the like. Subsequently, an electrolytic solution is injected into the battery can 11 to impregnate the wound electrode body 20 with the electrolytic solution. Finally, the battery lid 14, the safety valve mechanism 15 and the heat-sensing resistive element 16 are crimped to an open end part of the battery can 11 with the gasket 17 interposed therebetween. In this manner, a cylinder-type secondary battery is completed.

According to this secondary battery, the electrolytic solution has the same composition as that of the present technology, and therefore the occurrence of a decomposition reaction of the electrolytic solution during charging-discharging can be prevented, as mentioned above. As a result, excellent battery characteristics can be achieved. Other actions and effects are the same as those of the electrolytic solution of the present technology.

Figure 3:
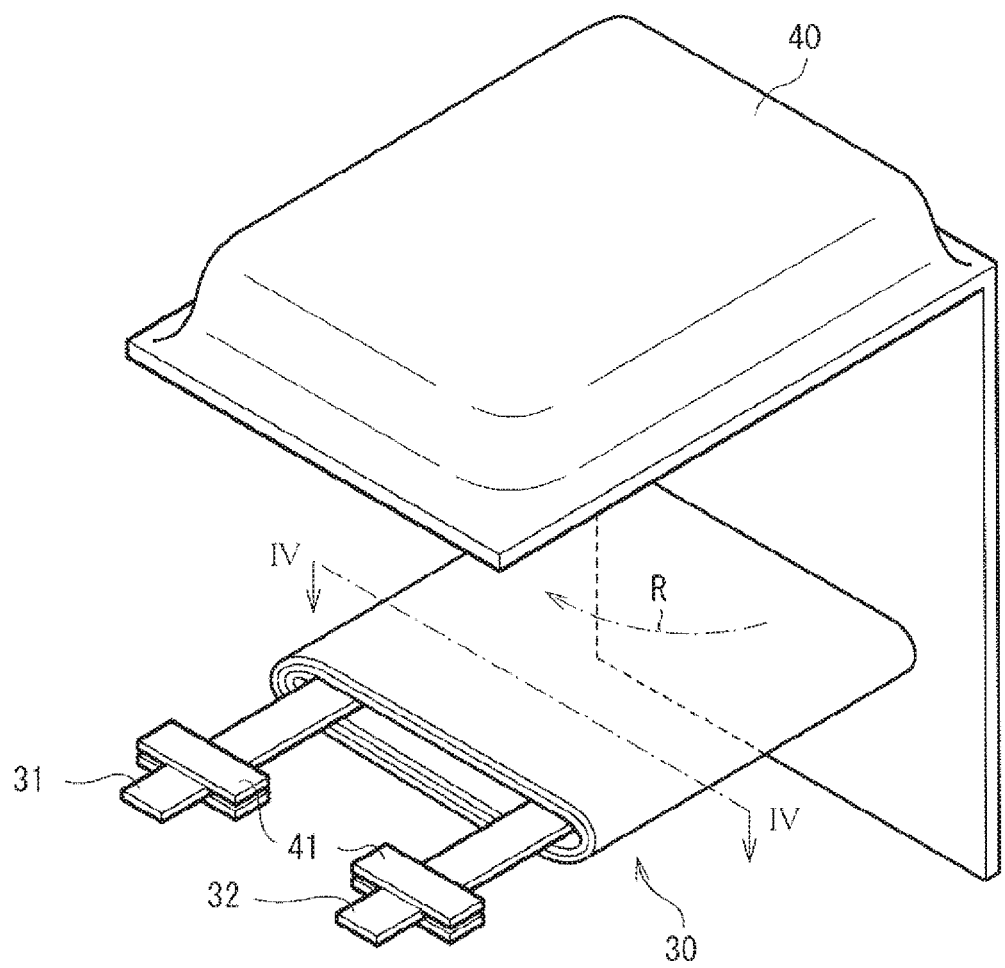
FIG. 3 is a perspective view illustrating a configuration of a (laminate film-type) secondary battery according to an embodiment of the present technology.
Figure 4:
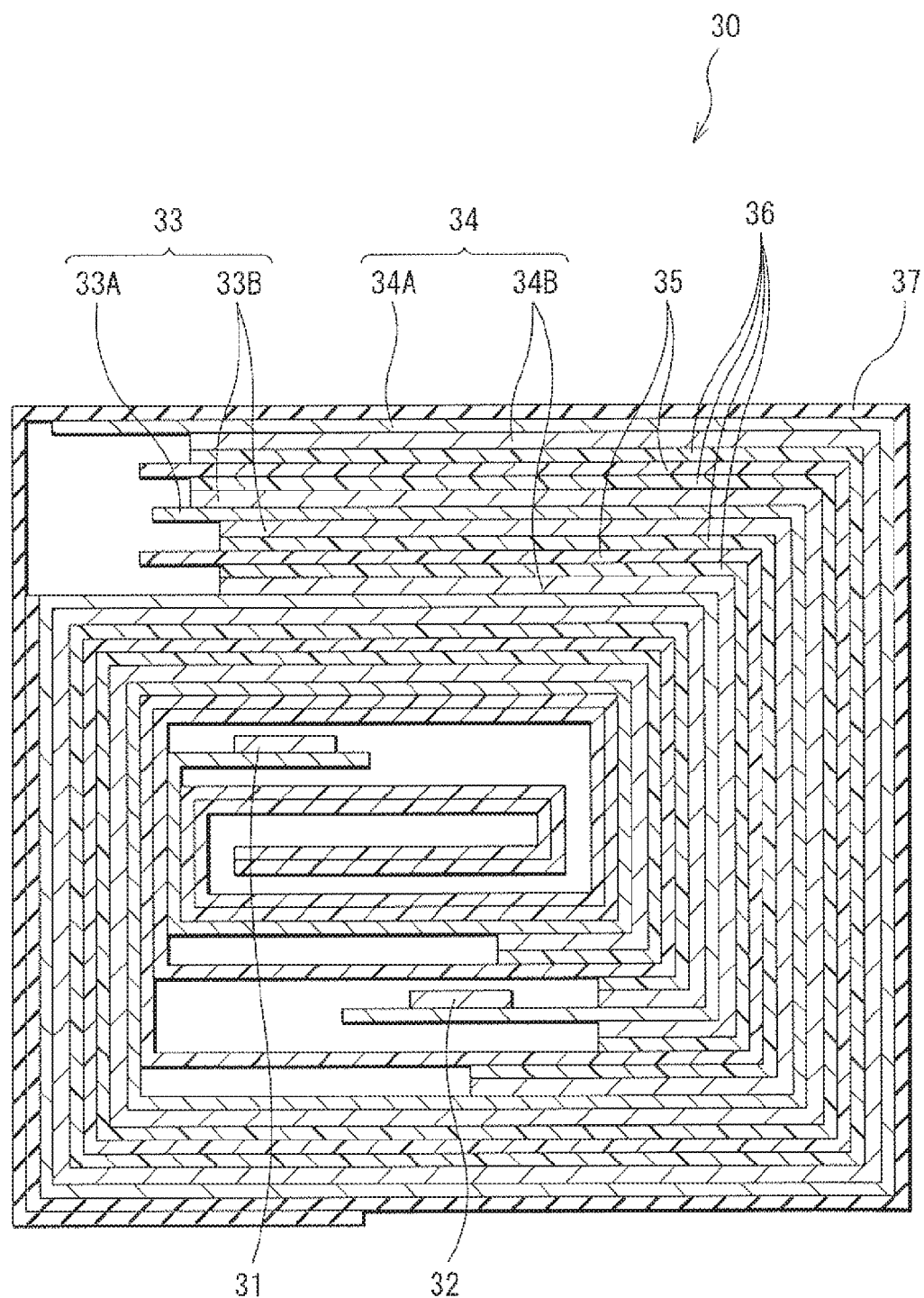
FIG. 4 is a cross-sectional view of a wound electrode body, which is taken along line IV-IV shown in FIG. 3.

FIG. 3 shows a perspective configuration of another secondary battery, and FIG. 4 shows a cross section of a wound electrode body 30 shown in FIG. 3 which is taken along line IV-IV shown in FIG. 3. In FIG. 3, the wound electrode body 30 and an external packaging member 40 are separated from each other.

In the following explanation, the constituent elements of the cylinder-type secondary battery which are already described are referred as needed.

The secondary battery is a lithium ion secondary battery having a so-called "laminate film-type battery structure", and the wound electrode body 30 that is a battery element is housed in a film-shaped external packaging member 40 as shown in FIG. 3, for example. In the wound electrode body 30, a positive electrode 33 and a negative electrode 34 are laminated on each other with a separator 35 and electrolyte layers 36 interposed therebetween, and a laminate of the positive electrode 33, the negative electrode 34, the separator 35 and the electrolyte layers 36 is wound, for example. A positive electrode lead 31 is attached to the positive electrode 33, and a negative electrode lead 32 is attached to the negative electrode 34. The outermost periphery of the wound electrode body 30 is protected by a protective tape 37.

The positive electrode lead 31 and the negative electrode lead 32 are guided in the same direction, for example, from the inside of the external packaging member 40 toward the outside of the external packaging member 40. The positive electrode lead 31 contains at least one conductive material such as aluminum (Al). The negative electrode lead 32 contains, for example, at least one conductive material such as copper (Cu), nickel (Ni) and a stainless steel. The conductive material has, for example, a thin film-like or net-like form.

The external packaging member 40 is, for example, a single film that can be folded in the direction shown by an arrow R in FIG. 3, and a depression in which the wound electrode body 30 is to be housed is provided on at least a portion of the external packaging member 40. The external packaging member 40 is, for example, a laminate film composed of a melt-bonding layer, a metal layer and a surface protection layer that are laminated in this order. In the step of producing the secondary battery, the external packaging member 40 is folded in such a manner that the melt-bonding layers can face each other with the wound electrode body 30 interposed therebetween and the outer peripheries of the melt-bonding layers are melt-bonded to each other. The external packaging member 40 may be composed of two laminate films that are bonded to each other with an adhesive agent or the like. The melt-bonding layer includes, for example, at least one film selected from a polyethylene film, a polypropylene film and others. The metal layer includes, for example, at least one member selected from an aluminum foil and the like. The surface protection layer includes, for example, at least one film selected from a nylon film, a polyethylene terephthalate film and the like.

Particularly, the external packaging member 40 is preferably an aluminum laminate film produced by laminating a polyethylene film, an aluminum foil and a nylon film in this order. The external packaging member 40 may be a laminate film having another lamination structure, or may be a polymer film (e.g., a polypropylene film) or a metal film.

Between the external packaging member 40 and the positive electrode lead 31, an adhesion film 41 is interposed for the purpose of preventing the invasion of external air, for example. Between the external packaging member 40 and the negative electrode lead 32, the adhesion film 41 is interposed, for example. The adhesion film 41 contains a material having close adhesiveness to both of the positive electrode lead 31 and the negative electrode lead 32. The material having the close adhesiveness is, for example, a polyolefin resin, and is more specifically at least one material selected from polyethylene, polypropylene, modified polyethylene, modified polypropylene and the like.

The positive electrode 33 includes, for example, a positive electrode current collector 33A and a positive electrode active material layer 33B, and the negative electrode 34 includes, for example, a negative electrode current collector 34A and a negative electrode active material layer 34B. The configurations of the positive electrode current collector 33A, the positive electrode active material layer 33B, the negative electrode current collector 34A and the negative electrode active material layer 34B are the same as, for example, those of the positive electrode current collector 21A, the positive electrode active material layer 21B, the negative electrode current collector 22A and the negative electrode active material layer 22B, respectively. The configuration of the separator 35 is the same as, for example, that of the separator 23.

An electrolyte layer 36 contains an electrolytic solution and a polymeric compound, and has the same composition as that of the present technology. Namely, the electrolytic solution contains a heterocyclic compound. The electrolyte layer 36 described herein is a so-called gel-like electrolyte, wherein the electrolytic solution is held by a polymeric compound. This is because a high ionic conductivity (e.g., 1 mS/cm or more at room temperature) can be achieved and the leakage of the electrolytic solution can be prevented. The electrolyte layer 36 may also contain at least one component selected from other materials including additives.

The polymeric compound includes, for example, at least one compound selected from polyacrylonitrile, poly(vinylidene fluoride), polytetrafluoroethylene, polyhexafluoropropylene, poly(ethylene oxide), poly(propylene oxide), polyphosphazene, polysiloxane, poly(vinyl fluoride), poly (vinyl acetate), poly(vinyl alcohol), poly(methyl methacrylate), poly(acrylic acid), poly(methacrylic acid), a styrene-butadiene rubber, a nitrile-butadiene rubber, polystyrene and polycarbonate. The polymeric compound may also be a copolymer. The copolymer is, for example, a copolymer of vinylidene fluoride and hexafluoropyrene or the like. Among these compounds, a preferred example of the homopolymer is poly(vinylidene fluoride), and a preferred example of the copolymer is a copolymer of vinylidene fluoride and hexafluoropyrene. This is because these compounds are electrochemically stable.

In the electrolyte layer 36 that is a gel-like electrolyte, the term "solvent" to be contained in the electrolytic solution is a wide-ranging concept including a liquid material as well as a material having ionic conductivity for dissociating an electrolyte salt. Therefore, in the case where a polymeric compound having ionic conductivity is used, the polymeric compound is also contained in the non-aqueous solvent.

It is also possible to use an electrolytic solution without any modification in place of the electrolyte layer 36. In this case, the wound electrode body 30 is impregnated with the electrolytic solution.

The secondary battery can be operated, for example, in the following manner.

During charging, lithium ions are released from the positive electrode 33, and the lithium ions are stored in the negative electrode 34 through the electrolyte layer 36. On the other hand, during discharging, lithium ions are released from the negative electrode 34, and the lithium ions are stored in the positive electrode 33 through the electrolyte layer 36.

A secondary battery provided with the gel-like electrolyte layer 36 can be produced by, for example, any one of the following three kinds of processes.

In the first process, the positive electrode 33 and the negative electrode 34 are produced in the same manner as for the production of the positive electrode 21 and the negative electrode 22. Namely, for the production of the positive electrode 33, positive electrode active material layers 33B are formed respectively on both surfaces of a positive electrode current collector 33A. For the production of the negative electrode 34, negative electrode active material layers 34B are formed respectively on both surfaces of the negative electrode current collector 34A. Subsequently, an electrolytic solution, a polymeric compound, an organic solvent and the like are mixed together to prepare a precursor solution. Subsequently, the precursor solution is applied onto the positive electrode 33, and then the precursor solution is dried to form the gel-like electrolyte layer 36. The precursor solution is applied onto the negative electrode 34, and then the precursor solution is dried to form the gel-like electrolyte layer 36. Subsequently, the positive electrode lead 31 is attached to the positive electrode current collector 33A by employing a welding method or the like, and the negative electrode lead 32 is attached to the negative electrode current collector 34A by employing a welding method or the like. Subsequently, the positive electrode 33 and the negative electrode 34 are laminated on each other with the separator 35 interposed therebetween, and then the positive electrode 33, the negative electrode 34 and the separator 35 are wound together to form the wound electrode body 30. Subsequently, a protective tape 37 is adhered onto the outermost periphery of the wound electrode body 30. Subsequently, the external packaging member 40 is folded so as to sandwich the wound electrode body 30 therebetween, and then the outer peripheral edges of the external packaging member 40 are bonded to each other by a thermal bonding method or the like to enclose the wound electrode body 30 in the external packaging member 40. In this case, the adhesion film 41 is inserted between the positive electrode lead 31 and the external packaging member 40, and the adhesion film 41 is also inserted between the negative electrode lead 32 and the external packaging member 40.

In the second process, the positive electrode lead 31 is attached to the positive electrode 33, and the negative electrode lead 32 is attached to a negative electrode 34. Subsequently, the positive electrode 33 and the negative electrode 34 are laminated on each other with the separator 35 interposed therebetween, and are then wound together to produce a wound body that is a precursor of the wound electrode body 30. Subsequently, a protective tape 37 is adhered onto the outermost periphery of the wound body. Subsequently, the external packaging member 40 is folded so as to sandwich the wound electrode body 30 therebetween, and then outer peripheral edges excluding one outer peripheral edge of the external packaging member 40 are bonded to each other by a thermal bonding method or the like to house the wound body in the bag-shaped external packaging member 40. Subsequently, an electrolytic solution, a monomer that is a raw material for a polymeric compound, a polymerization initiator, and optionally other materials such as a polymerization inhibitor are mixed together to prepare an electrolyte composition. Subsequently, the electrolyte composition is injected into the bag-shaped external packaging member 40, and then the external packaging member 40 is sealed by a thermal bonding method or the like. Subsequently, the monomer is thermally polymerized to form the polymeric compound. In this manner, the electrolytic solution can be held by the polymeric compound and therefore the gel-like electrolyte layer 36 can be formed.

In the third process, a wound body is produced by the same procedures as those in the second process, except that the separator 35 having polymeric compound layers formed thereon is used. Subsequently, the wound body is housed in the bag-shaped external packaging member 40. Subsequently, an electrolytic solution is prepared and then injected into the external packaging member 40, and then an opening of the external packaging member 40 is sealed by a thermal bonding method or the like. Subsequently, the external packaging member 40 is heated while applying a load to the external packaging member 40, thereby adhering the separator 35 to the positive electrode 33 with the polymeric compound layer interposed therebetween and also adhering the separator 35 to the negative electrode 34 with the separator 35 interposed therebetween. As a result, each of the polymeric compound layers is impregnated with the electrolytic solution and each of the polymeric compound layers is gelatinized. In this manner, the electrolyte layer 36 can be formed.

In the third process, the swelling of the secondary battery can be suppressed more effectively compared with the first process. Furthermore, compared with the second process, the non-aqueous solvent, the monomer (the raw material for the polymeric compound) and the like remain in little amounts in the electrolyte layers 36, and therefore the process of the formation of the polymeric compound can be controlled satisfactorily in the third process. As a result, the positive electrode 33, the negative electrode 34 and the separator 35 can be adhered to the electrolyte layers 36 satisfactorily.

According to the secondary battery, the electrolyte layer 36 contains an electrolytic solution and the electrolytic solution has the same composition as that of the electrolytic solution of the present technology. Therefore, for the same reasons as in the above-mentioned cylinder-type secondary battery, excellent battery characteristics can be produced. Other actions and effects are the same as those of the cylinder-type secondary battery.

The secondary battery described herein is a cylinder-type metal lithium secondary battery in which the capacity of a negative electrode 22 can be produced by the precipitation and dissolution of metal lithium. The secondary battery has the same configuration as that of the above-mentioned cylinder-type lithium ion secondary battery, except that a negative electrode active material layer 22B is formed by metal lithium, and can be produced in the same manner as for the production of the cylinder-type lithium ion secondary battery.

In the secondary battery, metal lithium is used as a negative electrode active material and therefore a high energy density can be achieved. The negative electrode active material layer 22B may be present already at the time of the assembly of the battery. Alternatively, the negative electrode active material layer 22B may not be present at the time of the assembly of the battery and may be formed with metal lithium that is precipitated during charging. Alternatively, it is also possible to use the negative electrode active material layer 22B as a current collector to eliminate a negative electrode current collector 22A.

The secondary battery can be operated, for example, in the following manner. During charging, lithium ions are released from the positive electrode 21 and the lithium ions are deposited in the form of metal lithium on the surface of the negative electrode current collector 22A through the electrolytic solution. During discharging, on the other hand, metal lithium is eluted in the form of lithium ions from the negative electrode active material layer 22B into electrolytic solution and the lithium ions are stored in the positive electrode 21 through the electrolytic solution.

According to this cylinder-type metal lithium secondary battery, the electrolytic solution has the same composition as that of the electrolytic solution according to the present technology, and therefore excellent battery characteristics can be achieved for the same reasons as mentioned with respect to the above-mentioned lithium ion secondary battery. Other actions and effects are the same as those of the lithium ion secondary battery.

The configuration of the metal lithium secondary battery described in this section may be applied to a laminate film-type secondary battery as well as the cylinder-type secondary battery. In this case, the same effects can also be achieved.

Next, examples of the application of the above-mentioned secondary battery will be described.

The use applications of the secondary battery are not particularly limited, and include a machine, a device, a tool, an apparatus and a system (i.e., an assembly of a plurality of devices) as long as the secondary battery is used as a power supply for driving purposes, an electric power storage source for electric power storage purposes or the like. When used as a power supply, the secondary battery may be a main power supply or an auxiliary power supply. The main power supply is a power supply that is used preferentially regardless of the presence or absence of other power supply. The auxiliary power supply may be, for example, a power supply that can be used in place of a main power supply or a power supply that can be switched from a main power supply as required. In the case where the secondary battery is used as an auxiliary power supply, the type of a main power supply is not limited to a secondary battery.

The use applications of the secondary battery include the followings: an electronic device (including a mobile electronic device), such as a video camera, a digital still camera, a mobile phone, a note-type personal computer, a cordless phone, a headset stereo, a mobile radio, a mobile television and a personal digital assistant; a mobile daily instrument such as an electric shaver; a storage device such as a backup power supply and a memory card; an electric power tool such as an electric drill and an electric saw; a battery pack that is installed as a removable power supply in a note-type personal computer or the like; a medical electronic device such as a pacemaker and a hearing aid; an electric vehicle such as an electric car (including a hybrid car); and an electric power storage system for accumulating an electric power for emergencies and the like, such as a battery system for home use. As a matter of course, the use application of the secondary battery may be other than the above-mentioned use applications.

Particularly, the secondary battery can be used effectively in a battery pack, an electric vehicle, electric power storage system, an electric power tool, an electronic device and the like. In these use applications, excellent battery characteristics are required. Therefore, the performance of these products can be improved effectively by using the secondary battery according to the present technology. A battery pack is a power supply provided with a secondary battery. The battery pack may be provided with a unit battery or an assembled battery, as mentioned below. An electric vehicle is a vehicle that can be operated (run) using a secondary battery as a driving power supply, and may be an automobile that is also provided with a driving source other than a secondary battery (e.g., a hybrid car), as mentioned above. An electric power storage system is a system in which a secondary battery is used as an electric power storage source. For example, in an electric power storage system for home use, an electric power is accumulated in a secondary battery that serves as an electric power storage source. Therefore, the electric power storage system for home use can be used as an electric appliance for home use or the like by utilizing the electric power. An electric power tool is a tool in which a movable unit (e.g., a drill) is driven utilizing a secondary battery as a driving power supply. An electronic device is a device that can exert various functions thereof by utilizing a secondary battery as a driving power supply (an electric power supply source).

Hereinbelow, some use applications of the secondary battery will be described concretely. The configurations of the application examples described below are intended only as illustrations, and the configurations can be varied as required.

Figure 5:
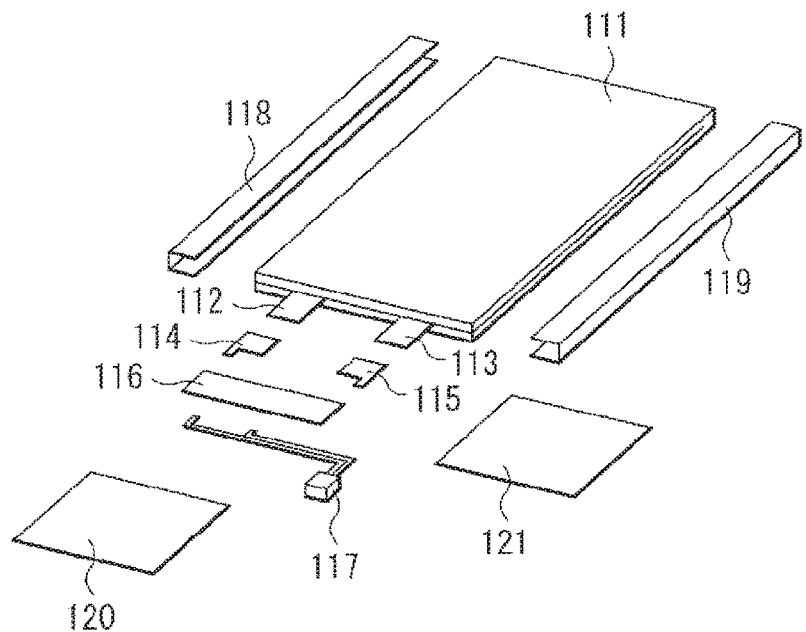
FIG. 5 is a perspective view illustrating a configuration of a use application example of the secondary battery (a battery pack: a unit battery) according to an embodiment of the present technology.
Figure 6:
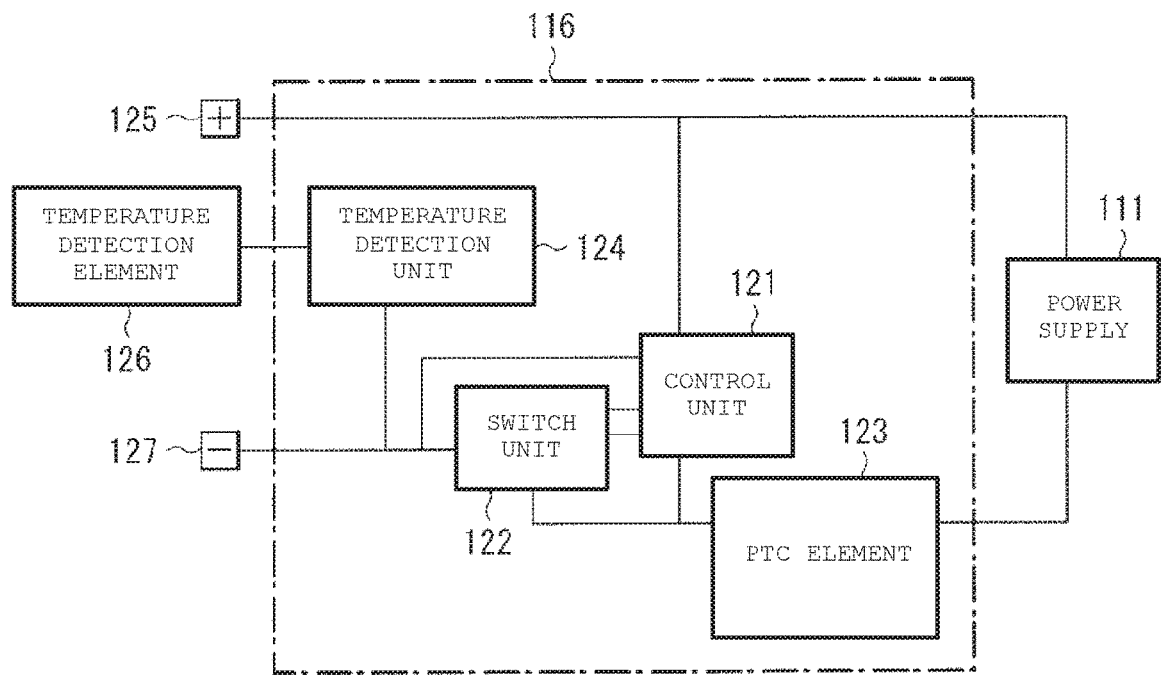
FIG. 6 is a block diagram illustrating a configuration of the battery pack shown in FIG. 5.

FIG. 5 is a perspective configuration of a battery pack provided with a unit battery. FIG. 6 is a block configuration of the battery pack shown in FIG. 5. In FIG. 5, a state where the battery pack is disassembled is shown.

The battery pack described in this section is a handy battery pack (i.e., a soft pack) provided with a single secondary battery according to the present technology, and can be installed in an electronic device typified by a smart phone. As shown in FIG. 5, the battery pack is provided with, for example: a power supply 111 that is a laminate film-type secondary battery and a circuit board 116 connected to the power supply 111. To the power supply 111, a positive electrode lead 112 and a negative electrode lead 113 are attached.

To both side surfaces of the power supply 111, a pair of adhesive tapes 118 and 119 are respectively adhered. On the circuit board 116, a protection circuit module (PCM) is formed. The circuit board 116 is connected to a positive electrode 112 via a tab 114, and is also connected to the negative electrode lead 113 via a tab 115. The circuit board 116 is connected to a connector-attached wire lead 117 for external connection. In the state where the circuit board 116 is connected to the power supply 111, the circuit board 116 is protected by a label 120 and an insulating sheet 121. By adhering the label 120, the circuit board 116, the insulating sheet 121 and the like are fixed.

The battery pack is also provided with, for example, a power supply 111 and a circuit board 116, as shown in FIG. 6. The circuit board 116 is also provided with, for example, a control unit 121 (controller), a switch unit 122 (switch), a PTC element 123 and a temperature detection unit 124. The power supply 111 can be connected to the outside through a positive electrode terminal 125 and a negative electrode terminal 127, and therefore the power supply 111 can be charged and discharged through the positive electrode terminal 125 and the negative electrode terminal 127. The temperature detection unit 124 can detect a temperature using a temperature detection terminal (so-called T terminal) 126.

The control unit 121 controls the entire operation of the battery pack (including the state of usage of the power supply 111). The control unit 121 includes, for example, a central processing unit (e.g., a CPU), a processor, a memory or the like.

When, for example, the battery voltage reaches an overcharge detection voltage, the control unit 121 disconnects the switch unit 122 so that a charge current cannot flow into the current passage of the power supply 111. When, for example, a high current flows during charging, the control unit 121 disconnects the switch unit 122 so as to shut off a charge current.

On the other hand, when, for example, the battery voltage reaches an overdischarge detection voltage, the control unit 121 disconnects the switch unit 122 so that a discharge current cannot flow into the current passage of the power supply 111. When, for example, a high current flows during discharging, the control unit 121 disconnects the switch unit 122 so as to shut off a discharge current.

The overcharge detection voltage is, for example, 4.2 V±0.05 V and the overdischarge detection voltage is, for example, 2.4 V±0.1 V.

The switch unit 122 switches the state of usage of the power supply 111, i.e., the connection or disconnection of the power supply 111 to an external device, in response to a command from the control unit 121. The switch unit 122 includes, for example, a charge control switch, a discharge control switch and the like as components thereof. Each of the charge control switch and the discharge control switch is, for example, a semiconductor switch such as a metal oxide semiconductor field-effect transistor (e.g., a MOSFET). The charge-discharge current can be detected, for example, on the basis of the ON resistance of the switch unit 122.

The temperature detection unit 124 measures the temperature of the power supply 111 and outputs the result of the measurement of the temperature to the control unit 121. The temperature detection unit 124 includes, for example, a temperature detection element such as a thermistor as a component thereof. In the case where the control unit 121 performs a charge-discharge control upon the occurrence of abnormal heat generation, the result of the measurement of the temperature measured by the temperature detection unit 124 is used for the correction processing by the control unit 121 in the calculation of a remaining capacity and the like.

Alternatively, the circuit board 116 may not be provided with a PTC element 123. In this case, the PTC element may be attached to the circuit board 116 separately.

Figure 7:
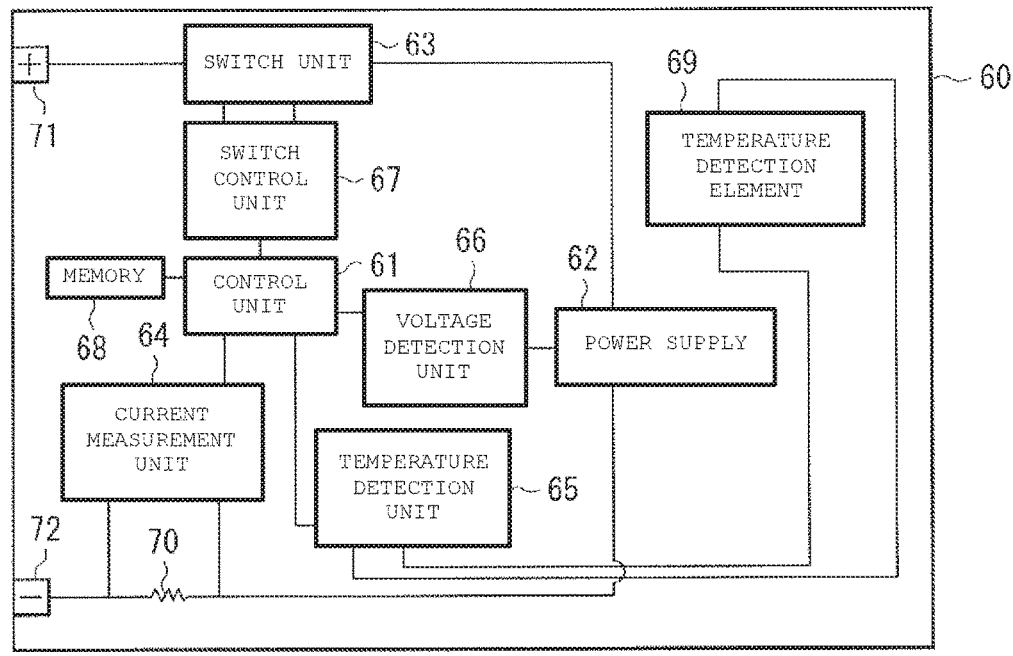
FIG. 7 is a block diagram illustrating a configuration of a use application example of the secondary battery (a battery pack: an assembled battery) according to an embodiment of the present technology.

FIG. 7 shows the block configuration of a battery pack provided with an assembled battery.

The battery pack is provided with, for example: a housing 60; and a control unit 61 (controller), a power supply 62, a switch unit 63 (switch), a current measurement unit 64, a temperature detection unit 65, a voltage detection unit 66, a switch control unit 67, a memory 68, a temperature detection element 69, a current detection resistor 70, a positive electrode terminal 71 and a negative electrode terminal 72 all of which are housed in the housing 60. The housing 60 contains, for example, a plastic material.

The control unit 61 can control the entire operation of the battery pack (including the state of usage of the power supply 62). The control unit 61 includes, for example, a CPU as a component thereof. The power supply 62 is an assembled battery including at least two types of secondary batteries according to the present technology, and the mode of connection between the at least two types of secondary batteries may be in series, or in parallel or a mixed state thereof. In one example, the power supply 62 includes six secondary batteries that are connected to one another in a (2 in parallel)×(3 in series) configuration.

The switch unit 63 switches the state of usage of the power supply 62, i.e., the connection or disconnection of the power supply 62 to an external device, in response to the command from the control unit 61. The switch unit 63 is provided with, for example, a charge control switch, a discharge control switch, a charging diode and a discharging diode. Each of the charge control switch and the discharge control switch is, for example, a semiconductor switch such as a metal-oxide-semiconductor field-effect transistor (e.g., a MOSFET).

The current measurement unit 64 measures a current using the current detection resistor 70, and outputs the result of the measurement of the current to the control unit 61. The temperature detection unit 65 measures a temperature using the temperature detection element 69, and outputs the result of the measurement of the temperature to the control unit 61. In the case where the control unit 61 performs a charge-discharge control upon the occurrence of abnormal heat generation, the result of the measurement of the temperature is used for the correction processing by the control unit 61 in the calculation of a remaining capacity and the like. The voltage detection unit 66 measures a voltage of the secondary battery in the power supply 62, and supplies the result of the measurement of the voltage, which is analogue-digital converted, to the control unit 61.

The switch control unit 67 controls the operation of the switch unit 63 depending on signals respectively input from the current measurement unit 64 and the voltage detection unit 66.

When, for example, the battery voltage reaches an overcharge detection voltage, the switch control unit 67 disconnects the switch unit 63 (the charge control switch) so that a charge current cannot flow in the current passage in the power supply 62. As a result, in the power supply 62, only discharging through the discharging diode becomes possible. When, for example, a high current flows during charging, the switch control unit 67 shuts off the charge current.

When, for example, the battery voltage reaches an overdischarge detection voltage, the switch control unit 67 disconnects the switch unit 63 (the discharge control switch) so that a discharge current cannot flow in the current passage in the power supply 62. As a result, in the power supply 62, only charging through the charging diode becomes possible. When, for example, a high current flows during discharging, the switch control unit 67 shuts off the discharge current.

The overcharge detection voltage is, for example, 4.2 V±0.05 V, and the overdischarge detection voltage is, for example, 2.4 V±0.1 V.

The memory 68 includes, for example, an EEPROM that is a non-volatile memory. In the memory 68, a numerical value calculated by the control unit 61, information on the secondary batteries which is measured in the production process (e.g., an internal resistance in an initial state), and the like are stored. By storing a full charge capacity of each of the secondary batteries in the memory 68, it becomes possible to allow the control unit 61 to know information such as a remaining capacity.

The temperature detection element 69 measures the temperature of the power supply 62, and outputs the result of the measurement of the temperature to the control unit 61. The temperature detection element 69 is equipped with, for example, a thermistor.

Each of the positive electrode terminal 71 and the negative electrode terminal 72 is a terminal that can be connected to an external device capable of being driven with a battery pack (e.g., a note-type personal computer), an external device used for charging a battery pack (e.g., a charger) or the like. The power supply 62 can be charged and discharged through the positive electrode terminal 71 and the negative electrode terminal 72.

Figure 8:
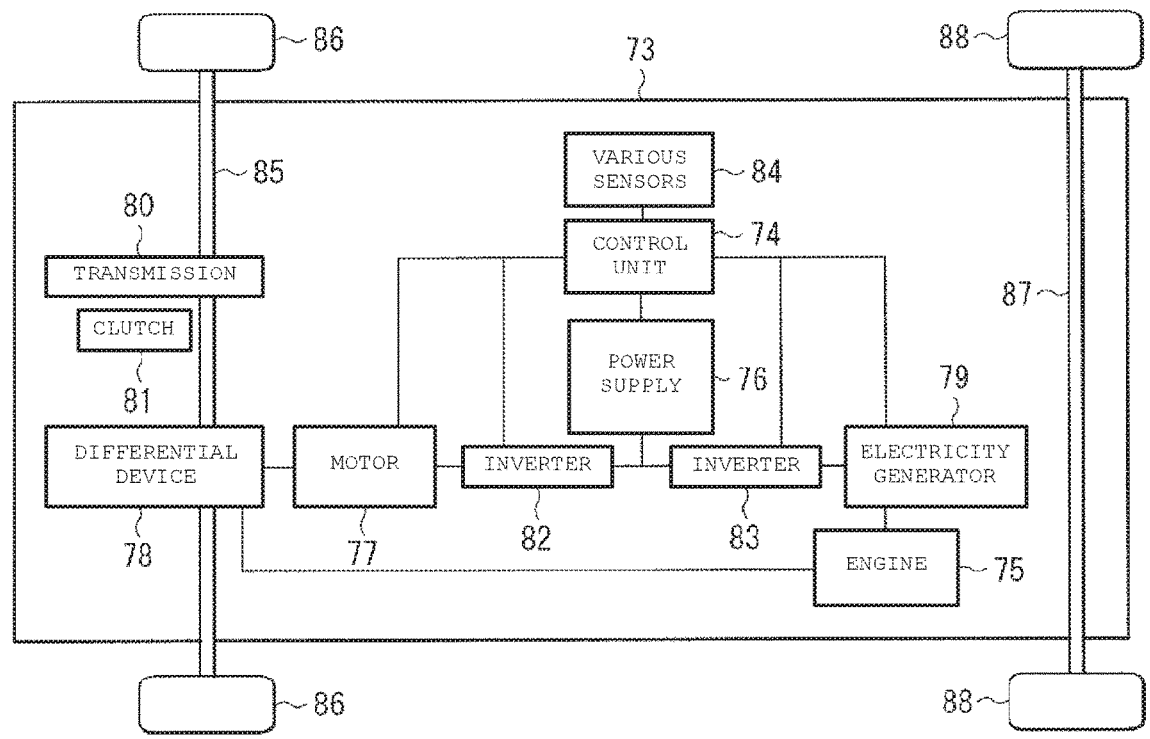
FIG. 8 is a block diagram illustrating a configuration of a use application example of the secondary battery (an electric vehicle) according to an embodiment of the present technology.

FIG. 8 shows a block configuration of a hybrid car that is one example of an electric vehicle.

The electric vehicle is provided with, for example: a metal-made housing 73; and a control unit 74 (controller), an engine 75, a power supply 76, a driving motor 77, a differential device 78, an electricity generator 79, a transmission 80, a clutch 81, inverters 82 and 83, and various sensors 84 all of which are housed in the housing 73. In addition, the electric vehicle is also provided with, for example, a front wheel drive shaft 85, front wheels 86, a rear wheel drive shaft 87 and rear wheels 88 all of which are connected to a differential device 78 and the transmission 80.

The electric vehicle can travel by utilizing either one of the engine 75 and the motor 77 as a driving source. The engine 75 is a main power source, such as a gasoline engine. In the case where the engine 75 is used as a power source, a driving force (rotational force) of the engine 75 is transmitted to the front wheels 86 and the rear wheels 88 through the differential device 78, the transmission 80 and the clutch 81 which are driving units (drivers), for example. The rotational force of the engine 75 is transmitted to the electricity generator 79, and therefore the electricity generator 79 generates an alternating-current power utilizing the rotational force. The alternating-current power is converted to a direct current electric power through the inverter 83, and therefore the direct current electric power is accumulated in the power supply 76. On the other hand, in the case where the motor 77, which is a conversion unit (converter), is used as a power source, an electric power (direct current electric power) supplied from the power supply 76 is converted to an alternating-current power through the inverter 82, and therefore the motor 77 is driven utilizing the alternating-current power. A driving force (rotational force) converted from the electric power by the motor 77 is transmitted to the front wheels 86 and the rear wheels 88 through the differential device 78, the transmission 80 and the clutch 81 which are driving units, for example.

When the electric vehicle is deaccelerated through a damping mechanism, a resisting force generated during the deacceleration is transmitted to the motor 77 as a rotational force. Therefore, it is also possible to generate an alternating-current power by the motor 77 by utilizing the rotational force. The alternating-current power is converted to a direct-current power through the inverter 82, and therefore it is preferred that the direct-current regenerative electric power be accumulated in the power supply 76.

The control unit 74 controls the entire operation of the electric vehicle. The control unit 74 is provided with, for example, a CPU. The power supply 76 is provided with at least one secondary battery according to the present technology. It is also possible that the power supply 76 is connected to an external power supply and receives the supply of an electric power from the external power supply so as to accumulate the electric power therein. The various sensors 84 are used, for example, for controlling the rotation speed of the engine 75 and also controlling the opening angle of a throttle valve (throttle opening angle). The various sensors 84 include, for example, at least one sensor selected from a speed sensor, an acceleration sensor and an engine rotating speed sensor.

In this section, a case where the electric vehicle is a hybrid car is exemplified. However, the electric vehicle may be a vehicle that can be driven only by the power supply 76 and the motor 77 without the need to utilize the engine 75 (i.e., an electric car).

Figure 9:
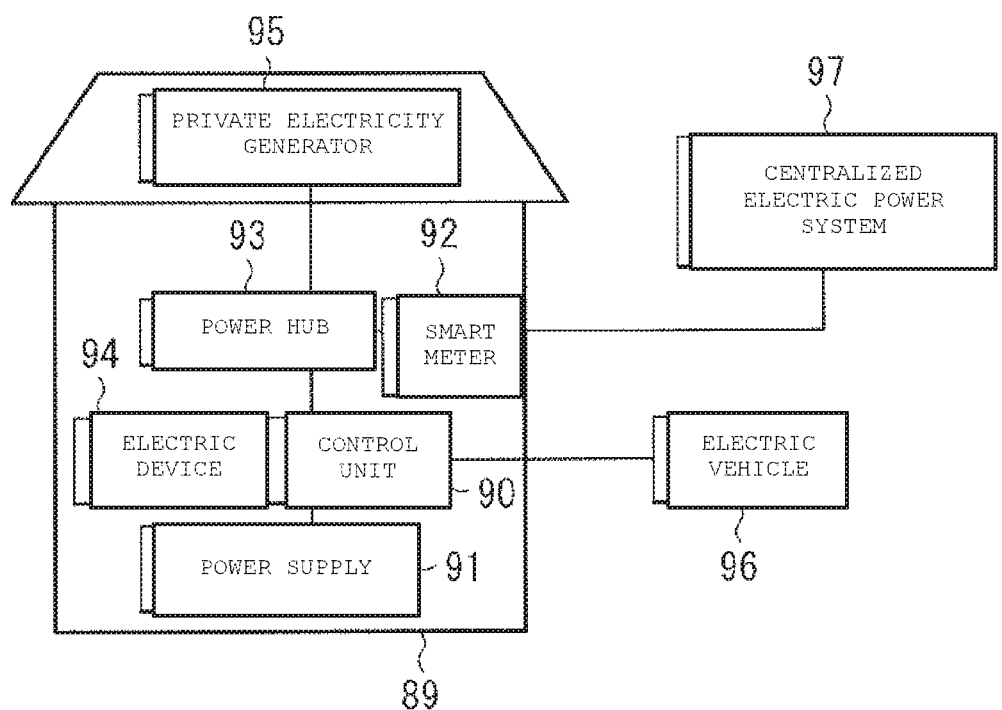
FIG. 9 is a block diagram illustrating a configuration of a use application example of the secondary battery (an electric power storage system) according to an embodiment of the present technology.

FIG. 9 shows a block configuration of an electric power storage system.

The electric power storage system is provided with a control unit 90 (controller), a power supply 91, a smart meter 92 and a power hub 93 all of which are housed in a house 89 such as a conventional home and a commercial building, for example.

In the electric power storage system, it is possible, for example, that the power supply 91 is connected to an electric device 94 that is placed in the house 89 and is also connected to an electric vehicle 96 that is parked at the outside of the house 89. Alternatively, it is also possible, for example, that the power supply 91 is connected to a private electricity generator 95 that is placed in the house 89 through the power hub 93 and is also connected to an external centralized electric power system 97 through the smart meter 92 and the power hub 93.

The electric device 94 also includes at least one home appliance such as a refrigerator, an air conditioner, a television and a water heater. The private electricity generator 95 includes, for example, at least one electricity generator selected from a solar power generator, a wind power generator and the like. The electric vehicle 96 includes, for example, at least one electric vehicle selected from an electric car, an electric motorcycle and a hybrid car. The centralized electric power system 97 includes, for example, at least one electric power system selected from a thermal power plant, a nuclear power plant, a hydroelectric power plant and a wind power plant.

The control unit 90 controls the entire operation of the electric power storage system (including the state of usage of the power supply 91). The control unit 90 includes, for example, a CPU. The power supply 91 includes at least one secondary battery according to the present technology. The smart meter 92 is, for example, a network-compatible electric power meter to be placed in a house 89 that demands an electric power, and can communicate with an electric power supply side. Therefore, the smart meter 92 controls the demand-supply balance of an electric power in the houses 89 while communicating with an outside to thereby enable the highly efficient and steady energy supply, for example.

In the electric power storage system, an electric power from the centralized electric power system 97, which is an external power supply, is accumulated in the power supply 91 through the smart meter 92 and the power hub 93, and an electric power from the private electricity generator 95, which is an independent power supply, is accumulated in the power supply 91 through the power hub 93. The electric power accumulated in the power supply 91 is supplied to the electric device 94 and the electric vehicle 96 in response to a command from the control unit 90. As a result, the electric device 94 becomes in an operable state and the electric vehicle 96 becomes in a chargeable state. Namely, the electric power storage system is a system that enables the accumulation and supply of an electric power in the house 89 by utilizing the power supply 91.

The electric power accumulated in the power supply 91 can be used as required. Therefore, it is possible, for example, that an electric power from the centralized electric power system 97 is accumulated in the power supply 91 during midnight in which an electric power rate is inexpensive, and the electric power accumulated in the power supply 91 is used during the daytime in which an electric power rate is expensive.

The above-mentioned electric power storage system may be placed in every house (every family), or may be placed in every several houses (every several families).

Figure 10:
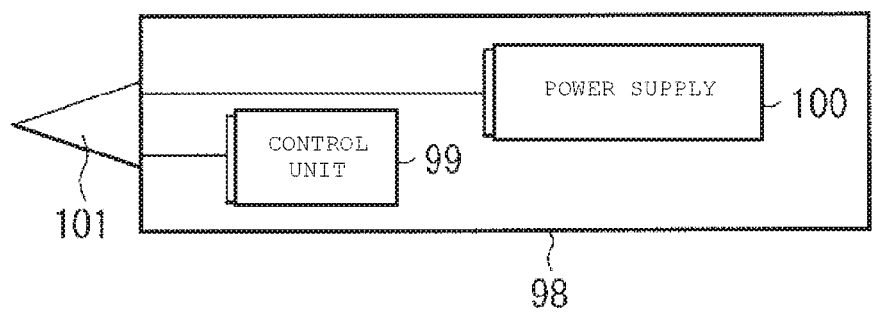
FIG. 10 is a block diagram illustrating a configuration of a use application example of the secondary battery (an electric power tool) according to an embodiment of the present technology.

FIG. 10 shows a block configuration of an electric power tool.

The electric power tool described in this section is, for example, an electric drill. The electric power tool is provided with, for example; a tool main body 98; and a control unit 99 and a power supply 100 both of which are arranged in the tool main body 98. In the tool main body 98, a drill part 101, which is a movable unit, is installed operably (rotatably).

The tool main body 98 contains, for example, a plastic material. The control unit 99 controls the entire operation of the electric power tool (including the state of usage of the power supply 100). The control unit 99 includes, for example, a CPU. The power supply 100 includes at least one secondary battery according to the present technology. The control unit 99 supplies an electric power from the power supply 100 to the drill part 101 in response to the operation of an operation switch.

The examples of the present technology will be described hereinbelow.

Experimental Examples 1-1 to 1-8

Each of laminate film-type lithium ion secondary batteries shown in FIG. 3 and FIG. 4 was produced in the following manner.

For the production of a positive electrode 33, firstly, lithium carbonate ($Li_2CO_3$) was mixed with cobalt carbonate ($CoCO_3$), and then the mixture was fired in an air atmosphere (firing temperature=900° C., firing time=5 hours) to produce lithium cobalt oxide ($LiCoO_2$) which was a lithium-containing compound. In this case, the mixing ratio (by mole) between lithium carbonate and cobalt carbonate was as follows: (lithium carbonate): (cobalt carbonate)=0.5:1.

Subsequently, lithium carbonate was mixed with manganese carbonate ($MnCO_3$) to produce a coating material. In this case, the mixing ratio (by mole) between lithium and manganese was as follows: lithium:manganese=1:1.

Subsequently, the lithium-containing compound ($LiCoO_2$) was mixed with the coating material, and then the mixture was treated with a mechanochemical device (treatment time=1 hour). As a result, the surface of the lithium-containing compound was coated with the coating material to produce a firing precursor. The firing precursor was fired (temperature rising rate=3° C./min., highest temperature=900° C.), then the firing precursor was retained at the highest temperature (retention time=3 hours), and then the firing precursor was cooled slowly. In this manner, a coating layer containing the coating material was formed so as to coat the surface of the lithium-containing compound, and therefore a positive electrode active material was produced.

Subsequently, 91 parts by mass of a positive electrode active material, 3 parts by mass of a positive electrode binder (poly(vinylidene fluoride)) and 6 parts by mass of a positive electrode conducting agent (graphite) were mixed together to prepare a positive electrode mix. Subsequently, the positive electrode mix was introduced into an organic solvent (N-methyl-2-pyrrolidone), and then the organic solvent was stirred to produce a paste-like positive electrode mix slurry. Subsequently, the positive electrode mix slurry was applied onto both surfaces of a positive electrode current collector 33A (a strip-like aluminum foil having a thickness of 12 µm) with a coating device, and then the positive electrode mix slurry was dried to form a positive electrode active material layer 33B. Finally, the positive electrode active material layer 33B was compression-molded using a roll press machine.

For the production of a negative electrode 34, firstly 96 parts by mass of a negative electrode active material (graphite), 1.5 parts by mass of a negative electrode binder (a styrene-butadiene rubber), and 1.5 parts by mass of a thickening agent (carboxy methyl cellulose) were mixed together to produce a negative electrode mix. Subsequently, the negative electrode mix was introduced into pure water, and then the pure water was stirred to produce a paste-like negative electrode mix slurry. Subsequently, the negative electrode mix slurry was applied onto both surfaces of a negative electrode current collector 34A (a strip-like copper foil having a thickness of 15 µm) using a coating device, and then the negative electrode mix slurry was dried to form a negative electrode active material layer 34B. Finally, the negative electrode active material layer 34B was compression-molded using a roll press machine.

In the production of the positive electrode 33 and the negative electrode 34, the amounts of the positive electrode active material and the negative electrode active material were adjusted, respectively, so that the open circuit voltage upon being fully charged, i.e., the charge voltage, became 4.45 V.

For the production of a separator 35, firstly a polymeric compound (poly(vinylidene fluoride)), a plurality of inorganic particles (aluminum oxide) which served as a plurality of insulating particles, and an organic solvent (N-methyl-2-pyrrolidone) were mixed together, and then the mixture was stirred. As a result, the polymeric compound was dissolved in the organic solvent, and the plurality of insulating particles were dispersed in the organic solvent, and accordingly a liquid dispersion was produced. In this case, the mixing ratio (by mass) between the polymeric compound and the plurality of insulating particles was as follows: (the polymeric compound):(the plurality of insulating particles)=20:80.

Subsequently, a base material layer (a microporous polyethylene film having a thickness of 12 µm) was soaked in the liquid dispersion, and then the base material layer was removed from the liquid dispersion. Finally, the base material layer having the liquid dispersion attached thereonto was washed with water to remove the organic solvent contained in the liquid dispersion or the like, and then the base material layer having the liquid dispersion attached thereonto was dried with hot air (drying temperature=80° C.). In this manner, a polymeric compound layer in which poly(vinylidene fluoride) having the plurality of insulating particles dispersed therein was formed on both surfaces of the base material layer to produce a separator 35. The separator 35 was a separator having a so-called heat-resistant insulating layer attached thereto.

For the preparation of an electrolytic solution, an electrolyte salt ($LiPF_6$) was added to a solvent (ethylene carbonate (EC) that was a cyclic carbonic acid ester and ethyl methyl carbonate (EMC) that was a linear carbonic acid ester), and then a first heterocyclic compound was added to the solvent. In this case, the mixing ratio (by mass) between ethylene carbonate and ethyl methyl carbonate was as follows: (ethylene carbonate):(ethyl methyl carbonate)=50:50. The content of the electrolyte salt was 1.2 mol/kg relative to the amount of the solvent. The types of the first heterocyclic compound and the content (% by weight) of the first heterocyclic compound in the electrolytic solution are shown in Table 1.

For comparison, an electrolytic solution was prepared in the same manner, except that the first heterocyclic compound was not used. For comparison, electrolytic solutions were prepared in the same manner, except that another compounds were used in place of the first heterocyclic compound. The types of the another compounds and the contents (% by weight) of the another compounds in the electrolytic solutions are shown in Table 1.

For the assembly of a secondary battery, firstly an aluminum-made positive electrode lead 31 was welded to the positive electrode current collector 33A, and a copper-made negative electrode lead 32 was welded to the negative electrode current collector 34A. Subsequently, the positive electrode 33 and the negative electrode 34 were laminated on each other with the separator 35 interposed therebetween to produce a laminate. Subsequently, the laminate was wound in the length direction, and a protective tape 37 was attached to the outermost peripheral part of the laminate to produce a wound electrode body 30. Finally, an external packaging member 40 was folded so as to sandwich the wound electrode body 30 therebetween, and then three outer peripheral edges of the external packaging member 40 were thermally bonded to each other. The external packaging member 40 was an aluminum laminate film composed of a 25 µm-thick nylon film, a 40 µm-thick aluminum foil and a 30 µm-thick polypropylene film which were laminated in this order as observed from the outside. In this case, an adhesion film 41 was inserted between the positive electrode lead 31 and the external packaging member 40, and the adhesion film 41 was also inserted between the negative electrode lead 32 and the external packaging member 40. Finally, the electrolytic solution was injected into the inside of the external packaging member 40 to allow the separator 35 to be impregnated with the electrolytic solution, and the remaining one outer periphery of the external packaging member 40 was thermally bonded in a pressure-reduced environment. As a result, the wound electrode body 30 was packed in the inside of the external packaging member 40. In this manner, a laminate film-type lithium ion secondary battery was completed.

In order to evaluate the battery characteristics of each of the secondary batteries, a cycle characteristic and a swelling property of each of the secondary batteries were examined. The results shown in Table 1 were obtained.

In order to examine the cycle characteristic, firstly each of the secondary batteries was subjected to a charging/discharging procedure (3 cycles) in a high-temperature environment (temperature=30° C.). In the charging procedure, charging at a constant current was performed at a current density of 1 mA/cm$^2$ until the voltage reached 4.45 V, and then charging at a constant voltage was performed at a voltage of 4.45 V until the current density reached 0.02 mA/cm$^2$. In the discharging procedure, discharging at a constant current was performed at a current density of 1 mA/cm$^2$ until the voltage reached 3 V.

Subsequently, the secondary battery was subjected to a charging-discharging procedure (1 cycle) in an ambient temperature environment (temperature=20° C.) to measure a discharge capacity after the 4$^{th}$ cycle. In the charging procedure, charging at a constant current was performed at a current density of 4 mA/cm$^2$ until the voltage reached 4.45 V, and then charging at a constant voltage was performed at a voltage of 4.45 V until the current density reached 0.08 mA/cm$^2$. In the discharging procedure, discharging at a constant current was performed at a current density of 4 mA/cm$^2$ until the voltage reached 3 V.

Subsequently, the secondary battery was subjected to a charging-discharging procedure (100 cycles) in the same environment (temperature=20° C.) to measure a discharge capacity after the 104$^{th}$ cycle. The charging-discharging conditions were the same as the above-mentioned charging-discharging conditions employed for the 4$^{th}$ cycle.

Finally, a capacity retention rate (%)=(a discharge capacity after the 104$^{th}$ cycle/a discharge capacity after the 4$^{th}$ cycle)×100 was calculated.

In order to examine the swelling property, firstly the thickness of each of the secondary batteries before the charging-discharging procedure was measured. In this case, the secondary battery was sandwiched between two plates each having a larger surface area than that of the secondary battery, and then the distance between the two plates was measured. The thickness was the thickness of a part at which the thickness of the secondary battery became minimum.

Subsequently, the secondary battery was subjected to a charging-discharging procedure (1 cycle) in an ambient temperature (temperature=20° C.), and then the thickness of the secondary battery after the charging-discharging was measured in the same manner as mentioned above. The charging-discharging conditions were the same as those employed for the examination of the cycle characteristic.

Subsequently, a swelling ratio (%)=[(the thickness of the secondary battery after the charging-discharging − the thickness of the secondary battery before the charging-discharging)/the thickness of the secondary battery before the charging-discharging)×100 was calculated.

Finally, the swelling state of the secondary battery was determined on the basis of the swelling ratio. In this regard, the swelling state was rated "A" when the swelling ratio was less than 5%, the swelling state was rated "B" when the swelling ratio was 5% or more and less than 10%, the swelling state was rated "C" when the swelling ratio was 10% or more and less than 15%, and the swelling state was rated "D" when the swelling ratio was 15% or more.

TABLE 1

|  | First heterocyclic compound | | | | Capacity | |
| --- | --- | --- | --- | --- | --- | --- |
| Solvents | Type | Content (% by weight) | Type | Content (% by weight) | retention rate (%) | Swelling state |
| 1-1 EC + EMC |  | 1 | — | — | 84 | C |
| 1-2 | Formula (1-6) | 1 | — | — | 80 | C |
| 1-3 |  | 1 | — | — | 60 | C |
| 1-4 EC + EMC | — | — | — | — | 58 | D |
| 1-5 EC + EMC | — | — | — | 1 | <5 | D |
| 1-6 | — | — | — | 1 | <5 | D |
| 1-7 | — | — | — | 1 | 38 | D |
| 1-8 | — | — | SN | 1 | 50 | C |

EC: ethylene carbonate,
EMC: Ethyl methyl carbonate,
SN: succinonitrile

As apparent from Table 1, when the first heterocyclic compounds were used (Experimental Examples 1-1 to 1-3), the capacity retention rates greatly increased and the swelling state was greatly improved compared with the case where the first heterocyclic compounds were not used (Experimental Examples 1-4 to 1-8).

In detail, when neither first heterocyclic compound nor another compound was used (Experimental Examples 1-4), capacity retention rates to some extents were obtained but the secondary batteries were significantly swollen. In the comparative examination, the results of Experimental Examples 1-4 were employed as the criteria for the comparison.

In addition, when thiophene was used (Experimental Examples 1-5), the capacity retention rates were significantly reduced and the secondary batteries were significantly swollen.

In addition, even though a compound in which a substituent was introduced into a thiophene backbone, when two or more monovalent halogenated hydrocarbon groups were not introduced into the thiophene backbone and two or more nitrogen-containing groups were not introduced into the thiophene backbone (Experimental Examples 1-6, 1-7), the capacity retention rates were significantly reduced and the secondary batteries were significantly swollen.

In contrast, when two or more monovalent halogenated hydrocarbon groups were introduced into a thiophene backbone or two or more nitrogen-containing groups were introduced into a thiophene backbone (Experimental Examples 1-1 to 1-3), the capacity retention rates increased and the secondary batteries were less likely to be swollen.

When succinonitrile in which two cyano groups were contained but no thiophene backbone was contained was used (Experimental Example 1-8), the capacity retention rate decreased, unlike the case where a first heterocyclic compound containing two cyano groups and also containing a thiophene backbone was used (Experimental Examples 1-3).

Experimental Examples 2-1 to 2-24

Secondary batteries were produced and the battery characteristics were examined in the same manner as in Experimental Examples 1-1 to 1-8, except that the composition of each of the solvents was varied as shown in Table 2.

In this case, ethylene carbonate and propylene carbonate (PC), both of which were cyclic carbonic acid esters, were used as solvents in place of ethylene carbonate and ethyl methyl carbonate. Furthermore, diethyl carbonate (DEC) which was a linear carbonic acid ester, vinylene carbonate (VC) which was an unsaturated cyclic carbonic acid ester, 4-fluoro-1,3-dioxolan-2-one (FEC) which was a halogenated carbonic acid ester, or succinonitrile (SN) which was a dinitrile compound were added as an additive to the solvents. In this case, the content of the additive in the electrolytic solution was 1% by weight.

capacity retention rates compared with the case where propylene carbonate was not used (Experimental Examples 1-1 to 1-3).

When an unsaturated cyclic carbonic acid ester and a halogenated carbonic acid ester were used (Experimental Examples 2-7 to 2-12), the capacity retention rates increased compared with the case where an unsaturated cyclic carbonic acid ester and a halogenated carbonic acid ester were not used (Experimental Examples 2-1 to 2-3). In this case, high capacity retention rates can be obtained while sufficiently preventing the swelling of the secondary batteries particularly when an unsaturated cyclic carbonic acid ester and a halogenated carbonic acid ester, both of which can induce the swelling of the secondary batteries, were used.

When a dinitrile compound was used (Experimental Examples 2-13 to 2-15), the capacity retention rates increased while preventing the swelling of the secondary batteries compared with the case where the dinitrile compound was not used (Experimental Examples 2-1 to 2-3).

Experimental Examples 3-1 to 3-8

Secondary batteries were produced and the battery characteristics were examined in the same manner as in Experi-

TABLE 2

| Experimental Example No. | Solvents | First heterocyclic compound Type | Content (% by weight) | Another compound Type | Content (% by weight) | Capacity retention rate (%) | Swelling state |
|---|---|---|---|---|---|---|---|
| 2-1 | EC + PC | Formula (1-1) | 1 | — | — | 85 | A |
| 2-2 | | Formula (1-6) | 1 | — | — | 80 | A |
| 2-3 | | Formula (1-17) | 1 | — | — | 61 | B |
| 2-4 | EC + PC + | Formula (1-1) | 1 | — | — | 88 | C |
| 2-5 | DEC | Formula (1-6) | 1 | — | — | 82 | C |
| 2-6 | | Formula (1-17) | 1 | — | — | 60 | C |
| 2-7 | EC + PC + | Formula (1-1) | 1 | — | — | 89 | A |
| 2-8 | VC | Formula (1-6) | 1 | — | — | 88 | A |
| 2-9 | | Formula (1-17) | 1 | — | — | 65 | B |
| 2-10 | EC + PC + | Formula (1-1) | 1 | — | — | 89 | A |
| 2-11 | FEC | Formula (1-6) | 1 | — | — | 88 | A |
| 2-12 | | Formula (1-17) | 1 | — | — | 65 | B |
| 2-13 | EC + PC + | Formula (1-1) | 1 | — | — | 87 | A |
| 2-14 | SN | Formula (1-6) | 1 | — | — | 85 | A |
| 2-15 | | Formula (1-17) | 1 | — | — | 63 | B |
| 2-16 | EC + PC | — | — | — | — | <5 | D |
| 2-17 | EC + PC | — | — | Formula (16-1) | 1 | <5 | D |
| 2-18 | | — | — | Formula (16-2) | 1 | <5 | D |
| 2-19 | | — | — | Formula (16-3) | 1 | <5 | D |
| 2-20 | | — | — | SN | 1 | <5 | D |
| 2-21 | EC + PC + | — | — | Formula (16-1) | 1 | 30 | D |
| 2-22 | VC | — | — | Formula (16-2) | 1 | 40 | D |
| 2-23 | | — | — | Formula (16-3) | 1 | 48 | D |
| 2-24 | | — | — | SN | 1 | 55 | C |

EC: ethylene carbonate, PC: propylene carbonate, DEC: diethyl carbonate, VC: vinylene carbonate, FEC: 4-fluoro-1,3-dioxolan-2-one, SN: succinonitrile As apparent from Table 2, even when the composition of each of the solvents was varied, the same results as those shown in Table 1 were obtained. Namely, when a first heterocyclic compound was used (Experimental Examples 2-1 to 2-15), the capacity retention rates largely increased and the swelling state was largely improved, compared with the case where the first heterocyclic compound was not used (Experimental Examples 2-16 to 2-24).

Particularly when propylene carbonate was used (Experimental Examples 2-1 to 2-3), the secondary batteries were significantly less likely to be swollen while retaining high mental Examples 1-1 to 1-8 and 2-1 to 2-24, except that second heterocyclic compounds were used in place of the first heterocyclic compounds as shown in Table 3.

The types of the second heterocyclic compounds and the contents (% by weight) of the second heterocyclic compounds in the electrolytic solutions are shown in Table 3.

For comparison, electrolytic solutions were prepared in the same manner, except that another compounds were used in place of the second heterocyclic compounds. The types of another compounds and the contents (% by weight) of the another compounds in the electrolytic solutions are shown in Table 3.

TABLE 3

| Experimental Example No. | Solvents | First heterocyclic compound Type | Content (% by weight) | Another compound Type | Content (% by weight) | Capacity retention rate (%) | Swelling state |
|---|---|---|---|---|---|---|---|
| 3-1 | EC + PC | Formula (2-33) | 1 | — | — | 81 | A |
| 3-2 | | Formula (2-39) | 1 | — | — | 80 | A |
| 3-3 | | Formula (2-46) | 1 | — | — | 60 | B |
| 3-4 | EC + PC + VC | Formula (2-33) | 1 | — | — | 85 | A |
| 3-5 | | Formula (2-39) | 1 | — | — | 84 | A |
| 3-6 | | Formula (2-46) | 1 | — | — | 63 | B |
| 3-7 | EC + PC | — | — | Formula (17-2) | 1 | <5 | D |
| 3-8 | EC + PC + VC | — | — | Formula (17-2) | 1 | 25 | D |

EC: ethylene carbonate,
PC: propylene carbonate,
VC: vinylene carbonate

As apparent from Table 3, when the second heterocyclic compounds were used, similar results as those obtained when the first heterocyclic compounds were used (Tables 1 and 2) were obtained. Namely, when the second heterocyclic compounds were used (Experimental Examples 3-1 to 3-6), the capacity retention rates largely increased and the swelling state was largely improved compared with the case where the second heterocyclic compounds were not used (Experimental Examples 3-7, 3-8).

From the results shown in in Tables 1 to 3, it was demonstrated that, when an electrolytic solution contained a heterocyclic compound, excellent cycle characteristics were obtained and the swelling property was improved. Accordingly, excellent battery characteristics were obtained in a secondary battery.

Hereinabove, the present technology has been described with reference to its embodiments and examples. However, the present technology is not intended to be limited to those embodiments and examples, and various changes and modifications may be made in the technology.

Specifically, the present technology has been described taking embodiments in which the battery structures are of a cylinder-type and a laminate film type and each of the battery elements has a wound structure as examples. However, the present technology is not intended to be limited to these embodiments. The secondary battery according to the present technology is applicable to a case where the battery structure is of another type such as a square form and a coin-like form, and a case where the battery element has another structure such as a laminate structure.

In the embodiments and the examples, a lithium ion secondary battery in which the capacity of a negative electrode can be produced through the storage/release of lithium has been described. However, the present technology is not intended to be limited to the lithium ion secondary battery of this type. For example, the secondary battery according to the present technology may be a secondary battery in which the capacity of a negative electrode can be produced as the sum total of the capacity obtained through the storage/release of lithium and the capacity obtained through the deposition/dissolution of lithium by reducing the capacity of a negative electrode material capable of storing/releasing lithium to a value smaller than the capacity of a positive electrode.

In the embodiments and the examples, a case where lithium is used as the electrode reactive substance has been described. However, the present technology is not intended to be limited to this case. The electrode reactive substance may be, for example, other element belonging to Group 1 on the long-period periodic table, such as sodium (Na) and potassium (K), or may be an element belonging to Group 2 on the long-period periodic table, such as magnesium (Mg) and calcium (Ca), or may be other light metal such as aluminum (Al). Alternatively, the electrode reactive substance may also be an alloy containing at least one of the above-mentioned elements.

The effects described in this description are illustrative only and not restrictive, and the effects of the present technology are not intended to be limited thereto and may be other effects.

The present technology is described below in a further detail according to an embodiment.

(1)

A secondary battery provided with:

a positive electrode;

a negative electrode; and an electrolytic solution containing at least one of a first heterocyclic compound represented by formula (1) and a second heterocyclic compound represented by formula (2):

[formula (1)]

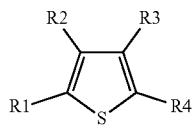

(1)

(wherein R1 to R4 independently represent any one group selected from a hydrogen group (—H), a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, wherein each of at least two of R1 to R4 represents a monovalent halogenated hydrocarbon group or at least one of R1 to R4 represents a nitrogen-containing group); and

[formula (2)]

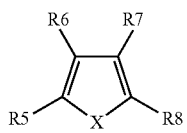
(2)

(wherein X represents any one group selected from a (nitrogen atom)-(hydrogen atom) (NH), an oxygen atom (O) and a (phosphorus atom)-(hydrogen atom) (PH); and R5 to R8 independently represent any one group selected from a hydrogen group, a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, wherein at least one of R5 to R8 represents any one group selected from a halogen group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other).

(2)
The secondary battery according to (1), wherein:
the halogen group includes a fluorine group (—F), a chlorine group (—Cl), a bromine group (—Br) and a iodine group (—I);
the monovalent hydrocarbon group includes an alkyl group, an alkenyl group, an alkynyl group, a cycloalkyl group, an aryl group and a monovalent group formed by bonding two or more of the aforementioned groups to each other;
the monovalent halogenated hydrocarbon group is a group produced by substituting at least one hydrogen group in the monovalent hydrocarbon group by the halogen group;
the monovalent oxygen-containing group includes a hydroxyl group (—OH), an alkoxy group (—OR101: wherein R101 represents any one group selected from an alkyl group and an aryl group), a carboxyl group (—COOH), a carboxylic acid ester group (—COOR102: wherein R102 represents any one group selected from an alkyl group and an aryl group), an aldehyde group (—CHO) and an acyl group (—COR103: wherein R103 represents any one group selected from an alkyl group and an aryl group);
the monovalent nitrogen-containing group includes a cyano group (—CN), an amino group (—NR104R105: wherein R104 and R105 independently represent any one group selected from a hydrogen group, an alkyl group and an aryl group), a nitro group (—NO$_2$), a nitroso group (—NO), an isocyanate group (—NCO), an azide group (—N$_3$) and a diazonium group (—N$_2^+$); and
the monovalent sulfur-containing group includes a sulfo group (—SO$_3$H), a thiol group (—SH), a thioether group (—SR106: wherein R106 represents any one group selected from an alkyl group and an aryl group) and a thioketone group (—CS—R107: wherein R107 represents any one group selected from an alkyl group and an aryl group.

(3)
The secondary battery according to (1) or (2), wherein each of at least two of the R1 to R4 represents a perfluoroalkyl group.

(4)
The secondary battery according to (3), wherein each of the R1 and the R4 represents the perfluoroalkyl group.

(5)
The secondary battery according to (3) or (4), wherein the number of carbon atoms in the perfluoroalkyl group is 1 to 10 inclusive.

(6)
The secondary battery according to (1) or (2), wherein each of at least two of the R1 to R4 represents the cyano group.

(7)
The secondary battery according to (6), wherein each of the R1 and the R4 represents the cyano group.

(8)
The secondary battery according to (1) or (2), wherein each of at least two of the R5 to R8 represents a perfluoroalkyl group.

(9)
The secondary battery according to (8), wherein each of the R5 and the R8 represents the perfluoroalkyl group.

(10)
The secondary battery according to (8) or (9), wherein the number of carbon atoms in the perfluoroalkyl group is 1 to 10 inclusive.

(11)
The secondary battery according to any one of (1) to (10), wherein the electrolytic solution contains at least one compound selected from unsaturated cyclic carbonic acid esters respectively represented by formula (3) to formula (5) and halogenated carbonic acid esters respectively represented by formula (6) and formula (7):

[formula (3) to (5)]

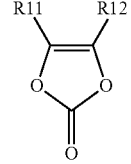
(3)

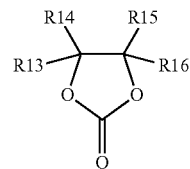
(4)

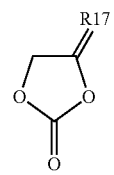
(5)

(wherein R11 and R12 independently represent any one group selected from a hydrogen group and an alkyl group; R13 to R16 independently represent any one group selected from a hydrogen group, an alkyl group, a vinyl group and an allyl group, wherein at least one of R13 to R16 represents any one group selected from a vinyl group and an allyl group; and R17 represents a group represented by formula>CR171R172, wherein R171 and R172 independently represent any one group selected from a hydrogen group and an alkyl group); and

[formula (6) to (7)]

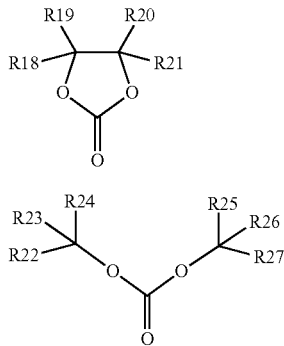

(wherein R18 to R21 independently represent any one group selected from a hydrogen group, a halogen group, an alkyl group and a halogenated alkyl group, wherein at least one of R18 to R21 represents any one group selected from a halogen group and a halogenated alkyl group; and R22 to R27 independently represent any one group selected from a hydrogen group, a halogen group, an alkyl group and a halogenated alkyl group, wherein at least one of R22 to R27 represents any one group selected from a halogen group and a halogenated alkyl group).

(12)
The secondary battery according to any one of (1) to (11), wherein the electrolytic solution contains at least one dinitrile compound represented by formula (9):

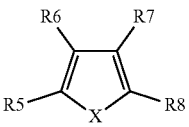

(wherein R28 represents any one group selected from a bivalent hydrocarbon group, a bivalent halogenated hydrocarbon group, a bivalent oxygen-containing group, a bivalent nitrogen-containing group, a bivalent sulfur-containing group, a bivalent phosphorus-containing group, and a bivalent group formed by bonding two or more of the aforementioned groups to each other).

(13)
The secondary battery according to any one of (1) to (12), wherein the electrolytic solution contains propylene carbonate.

(14)
The secondary battery according to any one of (1) to (13), wherein the secondary battery is a lithium ion secondary battery.

(15)
An electrolytic solution for a secondary battery, containing at least one of a first heterocyclic compound represented by formula (1) and a second heterocyclic compound represented by formula (2):

[formula (1)]

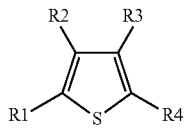

(wherein R1 to R4 independently represent any one group selected from a hydrogen group, a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, wherein each of at least two of R1 to R4 represents a monovalent halogenated hydrocarbon group or at least one of R1 to R4 represents a nitrogen-containing group); and

[formula (2)]

(wherein X represents any one group selected from a (nitrogen atom)-(hydrogen atom), an oxygen atom and a (phosphorus atom)-(hydrogen atom); and R5 to R8 independently represent any one group selected from a hydrogen group, a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, wherein at least one of R5 to R8 represents any one group selected from a halogen group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other).

(16)
A battery pack provided with:
a secondary battery as recited in any one of (1) to (14);
a control unit for controlling the operation of the secondary battery; and
a switch unit for switching the operation of the secondary battery in response to a command from the control unit.

(17)
An electric vehicle provided with:
a secondary battery as recited in any one of (1) to (14);
a conversion unit for converting an electric power supplied from the secondary battery to a driving force;
a driving unit for driving in response to the driving force; and
a control unit for controlling the operation of the secondary battery.

(18)
An electric power storage system provided with:
a secondary battery as recited in any one of (1) to (14);
at least one electric device to which an electric power is supplied from the secondary battery; and
a control unit for controlling the supply of an electric power from the secondary battery to the electric device.

(19)
An electric power tool provided with:
a secondary battery as recited in any one of (1) to (14); and
a movable unit to which an electric power is supplied from the secondary battery.

(20)
An electronic device provided with a secondary battery as recited in any one of (1) to (14) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode;
a negative electrode; and
an electrolytic solution including heterocyclic compound represented by formula (2):

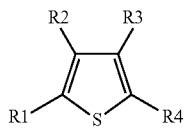

(1)

[formula (2)]

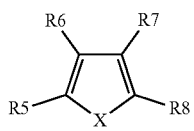

(2)

wherein X is selected from the group consisting of a (nitrogen atom)-(hydrogen atom) (NH), an oxygen atom (O) and a (phosphorus atom)-(hydrogen atom) (PH), and combinations thereof; and R5 to R8 independently represent any one group selected from the group consisting of a hydrogen group, a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, and combinations thereof, wherein at least one of R5 to R8 represents any one group selected from a halogen group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, and combinations thereof, and wherein at least two of the R5 to R8 each represent a perfluoroalkyl group.

2. The secondary battery according to claim 1, wherein:
the halogen group includes at least one of a fluorine group (—F), a chlorine group (—Cl), a bromine group (—Br) and a iodine group (—I);
the monovalent hydrocarbon group includes at least one of an alkyl group, an alkenyl group, an alkynyl group, a cycloalkyl group, an aryl group and a monovalent group formed by bonding two or more of the aforementioned groups to each other;

the monovalent halogenated hydrocarbon group includes a group produced by substituting at least one hydrogen group in the monovalent hydrocarbon group by the halogen group;

the monovalent oxygen-containing group includes at least one of a hydroxyl group (—OH), an alkoxy group (—OR101: wherein R101 represents any one group selected from an alkyl group and an aryl group, and combinations thereof), a carboxyl group (—COOH), a carboxylic acid ester group (—COOR102: wherein R102 represents any one group selected from an alkyl group and an aryl group, and combinations thereof), an aldehyde group (—CHO) and an acyl group (—COR103: wherein R103 represents any one group selected from an alkyl group and an aryl group, and combinations thereof);

the monovalent nitrogen-containing group includes at least one of a cyano group (—CN), an amino group (—NR104R105: wherein R104 and R105 independently represent any one group selected from a hydrogen group, an alkyl group and an aryl group, and combinations thereof), a nitro group (—NO$_2$), a nitroso group (—NO), an isocyanate group (—NCO), an azide group (—N$_3$) and a diazonium group (—N$_s^+$); and the monovalent sulfur-containing group includes at least one of a sulfo group (—SO$_3$H), a thiol group (—SH), a thioether group (—SR106: wherein R106 represents any one group selected from an alkyl group and an aryl group, and combinations thereof) and a thioketone group (—CS—R107: wherein R107 represents any one group selected from an alkyl group and an aryl group, and combinations thereof).

3. The secondary battery according to claim 1, wherein each of the R5 and the R8 represents the perfluoroalkyl group.

4. The secondary battery according to claim 1, wherein the number of carbon atoms in the perfluoroalkyl group is from 1 to 10.

5. The secondary battery according to claim 1, wherein the electrolytic solution includes at least one compound selected from unsaturated cyclic carbonic acid esters respectively represented by formula (3) to formula (5) and halogenated carbonic acid esters respectively represented by formula (6) and formula (7):

[formula (3) to (5)]

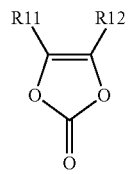

(3)

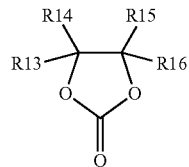

(4)

(5)

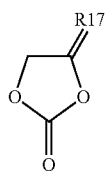

wherein R11 and R12 independently represent any one group selected from a hydrogen group and an alkyl group, and combinations thereof; R13 to R16 independently represent any one group selected from a hydrogen group, an alkyl group, a vinyl group and an allyl group, and combinations thereof, wherein at least one of R13 to R16 represents any one group selected from a vinyl group and an allyl group, and combinations thereof; and R17 represents a group represented by a formula>CR171R172, wherein R171 and R172 independently represent any one group selected from a hydrogen group and an alkyl group, and combinations thereof; and

[formula (6) to (7)]

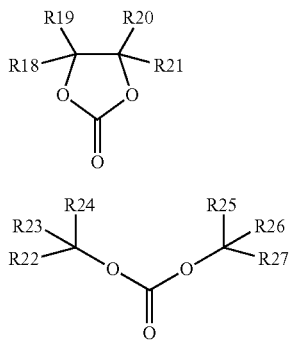

wherein R18 to R21 independently represent any one group selected from a hydrogen group, a halogen group, an alkyl group and a halogenated alkyl group, and combinations thereof, wherein at least one of R18 to R21 represents any one group selected from a halogen group and a halogenated alkyl group; and R22 to R27 independently represent any one group selected from a hydrogen group, a halogen group, an alkyl group and a halogenated alkyl group, and combinations thereof, wherein at least one of R22 to R27 represents any one group selected from a halogen group and a halogenated alkyl group, and combinations thereof.

6. The secondary battery according to claim 1, wherein the electrolytic solution includes at least one dinitrile compound represented by formula (9):

wherein R28 represents any one group selected from a bivalent hydrocarbon group, a bivalent halogenated hydrocarbon group, a bivalent oxygen-containing group, a bivalent nitrogen-containing group, a bivalent sulfur-containing group, a bivalent phosphorus-containing group, and a bivalent group formed by bonding two or more of the aforementioned groups to each other, and combinations thereof.

7. The secondary battery according to claim 1, wherein the electrolytic solution includes propylene carbonate.

8. The secondary battery according to claim 1, wherein the secondary battery includes a lithium ion secondary battery.

9. An electric vehicle comprising:
the secondary battery according to claim 1;
a converter configured to convert an electric power supplied from the secondary battery to a driving force;
a driver configured to drive in response to the driving force; and
a controller configured to control an operation of the secondary battery.

10. An electric power storage system comprising:
the secondary battery according to claim 1;
at least one electric device to which an electric power is configured to be supplied from the secondary battery; and
a controller configured to control the supply of an electric power from the secondary battery to the electric device.

11. An electric power tool comprising:
the secondary battery according to claim 1; and
a movable unit to which an electric power is configured to be supplied from the secondary battery.

12. An electronic device comprising the secondary battery according to claim 1 as an electric power supply source.

13. An electrolytic solution for a secondary battery, comprising heterocyclic compound represented by formula (2):

(1)

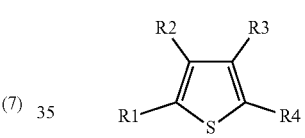

[formula (2)]

(2)

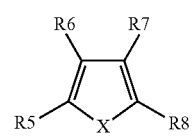

wherein X is selected from the group consisting of a (nitrogen atom)-(hydrogen atom) (NH), an oxygen atom (O) and a (phosphorus atom)-(hydrogen atom) (PH), and combinations thereof; and R5 to R8 independently represent any one group selected from the group consisting of a hydrogen group, a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, and combinations thereof, wherein at least one of R5 to R8 represents any one group selected from a halogen group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, and combinations thereof, and wherein at least two of the R5 to R8 each represent a perfluoroalkyl group.

14. A battery pack comprising:

a secondary battery;

a controller configured to control an operation of the secondary battery; and a switch configured to switch an operation of the secondary battery in response to a command from the controller, wherein the secondary battery includes:

a positive electrode;

a negative electrode; and an electrolytic solution including a second heterocyclic compound represented by formula (2):

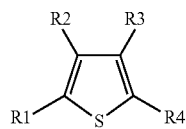

(1)

[formula (2)]

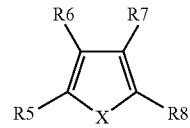

(2)

wherein X is selected from the group consisting of a (nitrogen atom)-(hydrogen atom) (NH), an oxygen atom (O) and a (phosphorus atom)-(hydrogen atom) (PH), and combinations thereof; and R5 to R8 independently represent any one group selected from the group consisting of a hydrogen group, a halogen group, a monovalent hydrocarbon group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, and combinations thereof, wherein at least one of R5 to R8 represents any one group selected from a halogen group, a monovalent halogenated hydrocarbon group, a monovalent oxygen-containing group, a monovalent nitrogen-containing group, a monovalent sulfur-containing group, and a monovalent group formed by bonding two or more of the aforementioned groups to each other, and combinations thereof, and wherein at least two of the R5 to R8 each represent a perfluoroalkyl group.

* * * * *